United States Patent
Enomoto et al.

(10) Patent No.: US 12,305,873 B2
(45) Date of Patent: May 20, 2025

(54) AIR-CONDITIONING SYSTEM, AIR-CONDITIONING CONTROL METHOD, AND AIR-CONDITIONING CONTROL PROGRAM

(71) Applicant: DENSO CORPORATION, Kariya (JP)

(72) Inventors: Nobuyuki Enomoto, Kariya (JP); Noriyuki Tomita, Kariya (JP); Ikuo Mizuma, Kariya (JP)

(73) Assignee: DENSO CORPORATION, Kariya (JP)

( * ) Notice: Subject to any disclaimer, the term of this patent is extended or adjusted under 35 U.S.C. 154(b) by 263 days.

(21) Appl. No.: 17/883,979

(22) Filed: Aug. 9, 2022

(65) Prior Publication Data
US 2022/0381473 A1 Dec. 1, 2022

Related U.S. Application Data

(63) Continuation of application No. PCT/JP2020/048189, filed on Dec. 23, 2020.

(30) Foreign Application Priority Data

Feb. 12, 2020 (JP) .................. 2020-021748

(51) Int. Cl.
*F24F 11/63* (2018.01)
(52) U.S. Cl.
CPC .................... *F24F 11/63* (2018.01)
(58) Field of Classification Search
CPC .......... B60H 1/3232; B60H 2001/3255; B60H 1/00978; B60H 1/00985; B60P 3/20
See application file for complete search history.

(56) References Cited

U.S. PATENT DOCUMENTS

| | | | |
|---|---|---|---|
| 2008/0245783 A1 | 10/2008 | Aoyama et al. | |
| 2011/0302942 A1* | 12/2011 | Birchard | F24F 1/0323 236/44 C |
| 2016/0260058 A1 | 9/2016 | Benjamin et al. | |

FOREIGN PATENT DOCUMENTS

| | | |
|---|---|---|
| CN | 105172532 A | 12/2015 |
| JP | H07210743 A | 8/1995 |
| JP | H0996475 A | 4/1997 |

(Continued)

*Primary Examiner* — Lionel Nouketcha
(74) *Attorney, Agent, or Firm* — Harness, Dickey & Pierce, P.L.C.

(57) ABSTRACT

An air-conditioning system includes: an air conditioner mounted on a mobile body having a cold storage; an internal temperature sensor configured to measure an internal temperature inside the cold storage; a notification device configured to notify an error of the air conditioner; and a control unit configured to control an air-conditioning operation. The control unit includes an acquisition unit configured to acquire the internal temperature, a setting unit configured to set an appropriate temperature range of the cold storage, a determination unit configured to determine whether the internal temperature is within the appropriate temperature range, and a notification control unit configured to control an error notification using the notification device and perform a temperature error notification when the internal temperature is out of the appropriate temperature range after a pre-cooling by the air conditioner is completed, and does not perform the temperature error notification before the pre-cooling is completed.

9 Claims, 16 Drawing Sheets

(56) References Cited

FOREIGN PATENT DOCUMENTS

| | | |
|---|---|---|
| JP | H102624 A | 1/1998 |
| JP | H11132865 A | 5/1999 |
| JP | H11201824 A | 7/1999 |
| JP | H11201825 A | 7/1999 |
| JP | 2001215136 A | 8/2001 |
| JP | 2002071253 A | 3/2002 |
| JP | 2004251508 A | 9/2004 |
| JP | 2009011430 A | 1/2009 |
| WO | WO-2021161669 A1 | 8/2021 |

* cited by examiner

AIR-CONDITIONING SYSTEM, AIR-CONDITIONING CONTROL METHOD, AND AIR-CONDITIONING CONTROL PROGRAM

CROSS REFERENCE TO RELATED APPLICATION

The present application is a continuation application of International Patent Application No. PCT/JP2020/048189 filed on Dec. 23, 2020, which designated the U.S. and claims the benefit of priority from Japanese Patent Application No. 2020-21748 filed on Feb. 12, 2020. The entire disclosures of all of the above applications are incorporated herein by reference.

TECHNICAL FIELD

The present disclosure relates to an air-conditioning system, an air-conditioning control method and an air-conditioning control program.

BACKGROUND

A temperature recording device is provided with alarm generating means for alarming when the temperature of a luggage compartment of a vehicle deviates from an appropriate set value.

SUMMARY

According to one aspect of the present disclosure, an air-conditioning system includes: an air conditioner mounted on a mobile body having a cold storage; an internal temperature sensor configured to measure an internal temperature which is a temperature inside the cold storage; a notification device configured to notify an error of the air conditioner; and a control unit configured to control an air-conditioning operation. The control unit includes an acquisition unit configured to acquire the internal temperature, a setting unit configured to set an appropriate temperature range in the cold storage, a determination unit configured to determine whether the internal temperature is within the appropriate temperature range, and a notification control unit configured to control an error notification using the notification device. The notification control unit is configured to perform a temperature error notification when the internal temperature is out of the appropriate temperature range after a pre-cooling by the air conditioner is completed, and does not perform the temperature error notification before the pre-cooling by the air conditioner is completed.

DETAILED DESCRIPTION

Figure 1:
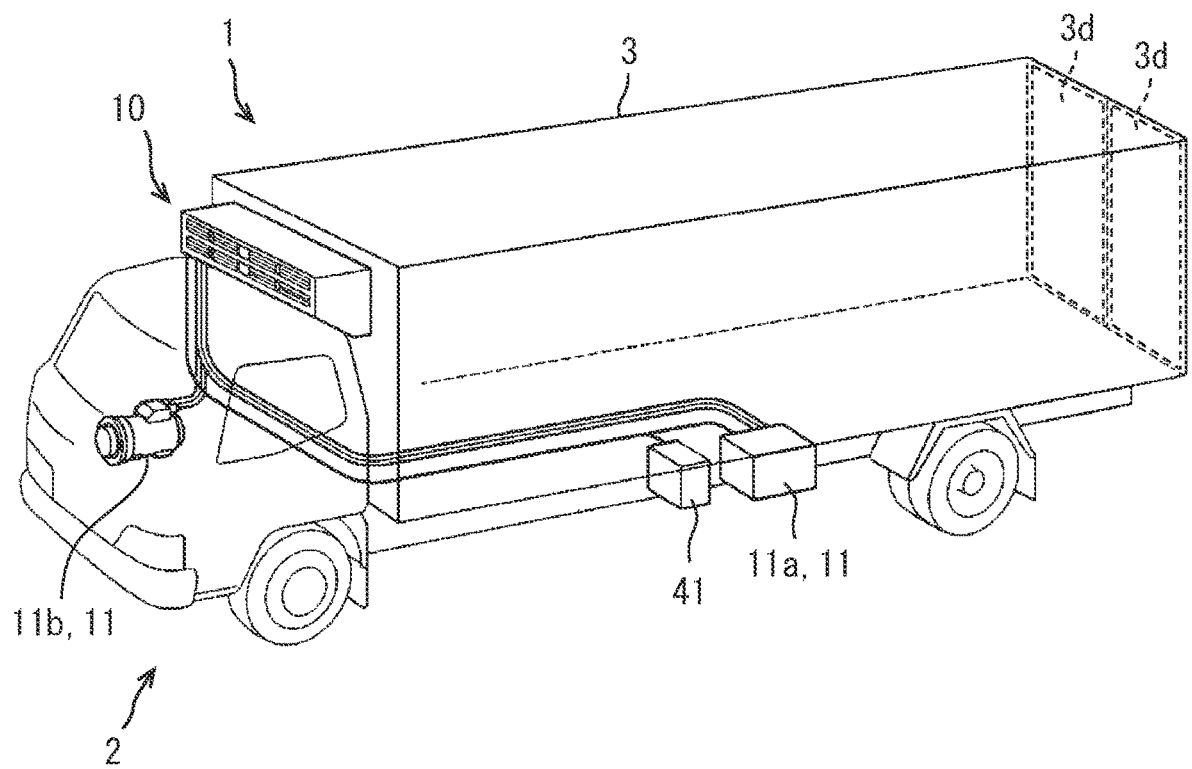
FIG. 1 is a perspective view showing a schematic configuration of a vehicle provided with a cold storage.

To begin with, examples of relevant techniques will be described.

A temperature recording device is provided with alarm generating means for alarming when the temperature of a luggage compartment of a vehicle deviates from an appropriate set value. This temperature recording device does not issue or suppress the alarming when a door of the luggage compartment is open even while the temperature of the luggage compartment is out of the proper range. The disclosure of the prior art literature is incorporated herein by reference as explanation of the technical elements in this disclosure.

In the prior art, the alarm sound is suppressed when the door of the luggage compartment is in the open state. This suppresses complicated alarm sounds under loading and unloading conditions where temperature abnormalities are expected in advance. However, there are situations in which a temperature abnormality is assumed in advance other than loading and unloading in which the door of the luggage compartment is open. For this reason, the air-conditioning system needs to effectively notify the error in various situations in which a temperature abnormality is expected in advance. Further improvements are required in the air-conditioning system in the above-mentioned viewpoints or in other viewpoints not mentioned.

The present disclosure provides an air-conditioning system capable of effectively notifying errors.

According to one aspect of the present disclosure, an air-conditioning system includes: an air conditioner mounted on a mobile body having a cold storage; an internal temperature sensor configured to measure an internal temperature which is a temperature inside the cold storage; a notification device configured to notify an error of the air conditioner; and a control unit configured to control an air-conditioning operation. The control unit includes an acquisition unit configured to acquire the internal temperature, a setting unit configured to set an appropriate temperature range in the cold storage, a determination unit configured to determine whether the internal temperature is within the appropriate temperature range, and a notification control unit configured to control an error notification using the notification device. The notification control unit is configured to perform a temperature error notification when the internal temperature is out of the appropriate temperature range after a pre-cooling by the air conditioner is completed, and does not perform the temperature error notification before the pre-cooling by the air conditioner is completed.

According to one aspect of the present disclosure, an air-conditioning control method for an air conditioner that conditions air inside of a cold storage provided in a mobile body includes: a temperature acquiring step acquiring an internal temperature which is a temperature in the cold storage; a temperature setting step setting an appropriate temperature range in the cold storage; a temperature determining step determining whether or not the internal temperature is within the appropriate temperature range; a pre-cooling determining step determining whether or not the air conditioner is in a pre-cooling which is an operation from a start of an air-conditioning operation until the internal temperature falls within the appropriate temperature range; and a notification step controlling an error notification using a notification device. The notification step performs a temperature error notification when the internal temperature is outside the appropriate temperature range after the pre-cooling is completed, and does not perform the temperature error notification before the pre-cooling is completed.

According to one aspect of the present disclosure, an air-conditioning control program for controlling an air-conditioning of an air conditioner that conditions air inside of a cold storage provided in a mobile body includes: acquiring an internal temperature which is a temperature in the cold storage; setting an appropriate temperature range in the cold storage; determining whether or not the internal temperature is within the appropriate temperature range; determining whether or not the air conditioner is in a pre-cooling which is an operation from a start of an air-conditioning operation until the internal temperature falls within the appropriate temperature range; and controlling an error notification using a notification device. A temperature error notification is performed when the internal temperature is outside the appropriate temperature range after the pre-cooling is completed, and the temperature error notification is not performed before the pre-cooling is completed.

According to the disclosed aspects, the temperature error notification is performed when the internal temperature is out of the proper temperature range after the completion of pre-cooling, and the temperature error notification is not performed before the completion of pre-cooling. Therefore, it is possible to suppress unnecessary error notification during the pre-cooling in which the internal temperature is expected to be out of the appropriate temperature range. Therefore, it is possible to provide an air-conditioning system or the like that can effectively notify an error.

According to one aspect of the present disclosure, an air-conditioning system includes: an air conditioner mounted on a mobile body having a cold storage; an internal temperature sensor configured to measure an internal temperature which is a temperature inside the cold storage; a position detection device configured to detect a current position of the mobile body; a notification device configured to notify an error of the air conditioner; and a control unit configured to control an air-conditioning operation. The control unit includes an acquisition unit configured to acquire the internal temperature, a setting unit configured to set an appropriate temperature range in the cold storage, a determination unit configured to determine whether the internal temperature is within the appropriate temperature range, and a notification control unit configured to control an error notification using the notification device. The notification control unit is configured to perform a temperature error notification when the internal temperature is out of the appropriate temperature range before the mobile body arrives at an unloading site, and does not perform the temperature error notification after the mobile body arrives at the unloading site.

According to one aspect of the present disclosure, an air-conditioning control method for an air conditioner that conditions air inside of a cold storage provided in a mobile body includes: a temperature acquiring step acquiring an internal temperature which is a temperature in the cold storage; a temperature setting step setting an appropriate temperature range in the cold storage; a temperature determining step determining whether or not the internal temperature is within the appropriate temperature range; a position determining step determining whether or not the mobile body arrives at an unloading site; and a notification step controlling an error notification using a notification device. The notification step performs a temperature error notification when the internal temperature is outside the appropriate temperature range before the mobile body arrives at the unloading site, and does not perform the temperature error notification after the mobile body arrives at the unloading site.

According to one aspect of the present disclosure, an air-conditioning control program for controlling an air-conditioning of an air conditioner that conditions air inside of a cold storage provided in a mobile body includes: acquiring an internal temperature which is a temperature in the cold storage; setting an appropriate temperature range in the cold storage; determining whether or not the internal temperature is within the appropriate temperature range; determining whether or not the mobile body arrives at an unloading site; and controlling an error notification using a notification device. A temperature error notification is performed when the internal temperature is outside the appropriate temperature range before the mobile body arrives at the unloading site, and the temperature error notification is not performed after the mobile body arrives at the unloading site.

According to the disclosed aspects, a temperature error notification is performed when the mobile body has not arrived at the unloading site and the internal temperature is out of the proper temperature range. The temperature error notification is not performed after the mobile body has arrived at the unloading site. Therefore, it is possible to suppress unnecessary error notification after the arrival at the unloading side where the internal temperature is expected to be out of the appropriate temperature range. Therefore, it is possible to provide an air-conditioning system or the like that can effectively notify an error.

According to one aspect of the present disclosure, an air-conditioning system includes: an air conditioner mounted on a mobile body having a cold storage; an internal temperature sensor configured to measure an internal temperature which is a temperature inside the cold storage; a speed detection device configured to detect a moving speed of the mobile body; a notification device configured to notify an error of the air conditioner; and a control unit configured to control an air-conditioning operation. The control unit includes an acquisition unit configured to acquire the internal temperature, a setting unit configured to set an appropriate temperature range in the cold storage, a determination unit configured to determine whether the internal temperature is within the appropriate temperature range, and a notification control unit configured to control an error notification using the notification device. The notification control unit is configured to perform a temperature error notification when the internal temperature is out of the appropriate temperature range while the mobile body is moving, and does not perform the temperature error notification while the mobile body is not moving.

According to one aspect of the present disclosure, an air-conditioning control method for an air conditioner that conditions air inside of a cold storage provided in a mobile body includes: a temperature acquiring step acquiring an internal temperature which is a temperature in the cold storage; a temperature setting step setting an appropriate temperature range in the cold storage; a temperature determining step determining whether or not the internal temperature is within the appropriate temperature range; a moving determining step determining whether or not the mobile body is moving; and a notification step controlling an error notification using a notification device. A temperature error notification is performed when the mobile body is moving and the internal temperature is outside the appropriate temperature range, and the temperature error notification is not performed while the mobile body stops moving.

According to one aspect of the present disclosure, an air-conditioning control program for controlling an air-conditioning of an air conditioner that conditions air inside of a cold storage provided in a mobile body includes: acquiring an internal temperature which is a temperature in the cold storage; setting an appropriate temperature range in the cold storage; determining whether or not the internal temperature is within the appropriate temperature range; determining whether or not the mobile body is moving; and controlling an error notification using a notification device (45, 390). A temperature error notification is performed when the mobile body is moving and the internal temperature is outside the appropriate temperature range, and the temperature error notification is not performed while the mobile body stops moving.

According to the disclosed aspects, when the mobile body is moving and the internal temperature is out of the proper temperature range, the temperature error notification is performed. When the mobile body is stopped moving, the temperature error notification is not performed. When unloading the object to be cooled in the cold storage to the outside of the cold storage, it is necessary to temporarily stop the moving of the mobile body. In other words, it is assumed that the unloaded is being performed while the moving of the mobile body is stopped. Therefore, it is possible to suppress unnecessary error notification at the timing when the internal temperature is assumed to be out of the appropriate temperature range in advance. Therefore, it is possible to provide an air-conditioning system or the like that can effectively notify an error.

The disclosed aspects in this specification adopt different technical solutions from each other in order to achieve their respective objectives. Reference numerals in parentheses described in claims and this section exemplarily show corresponding relationships with parts of embodiments to be described later and are not intended to limit technical scopes. The objects, features, and advantages disclosed in this specification will become apparent by referring to following detailed descriptions and accompanying drawings.

Hereinafter, embodiments are described with reference to the drawings. In some embodiments, functionally and/or structurally corresponding and/or associated parts may be given the same reference numerals, or reference numerals with different digit placed on equal to or higher than a hundred place. The description of other embodiments can be referred to for corresponding parts and/or associated parts.

First Embodiment

In FIG. 1, a vehicle 2 is a mobile body called a freezer car, a refrigerator car, or the like equipped with a cold storage 3. The cold storage 3 is made of a heat insulating panel having high heat insulating performance in order to reduce heat exchange with the outside. The object to be cooled is stored inside the cold storage 3, and the object to be cooled is transported to the destination at a low temperature together with the cold storage 3. The vehicle 2 can be used for transporting various objects to be cooled that require low temperature transport. The vehicle 2 can be used, for example, for low-temperature transportation of pharmaceutical products that require precise temperature control. The vehicle 2 can be used, for example, for low-temperature transportation of agricultural products and livestock products that are required to maintain a refrigerated temperature. The vehicle 2 can be used, for example, for low-temperature transportation of frozen foods that are required to maintain a freezing temperature. The vehicle 2 provides an example of a mobile body.

The temperature inside the refrigerator 3 is controlled by the air conditioner 10 so that the temperature inside the refrigerator 3 is maintained near the set temperature. The compressor 11 of the air conditioner 10 includes an electric compressor 11a and an engine driven compressor 11b. The electric compressor 11a is driven by being supplied with electric power from the power supply control unit 41. The engine driven compressor 11b is driven by obtaining power from the engine used for traveling the vehicle 2. However, the compressor 11 may be configured as either the electric compressor 11a or the engine driven compressor 11b. Further, the compressor 11 may be configured to include another compressor in addition to the electric compressor 11a and the engine driven compressor 11b.

The cold storage 3 has a cold storage door 3d for switching communication between the inside and the outside of the cold storage 3. The cold storage door 3d opens and closes in a double-door manner in the left and right direction. The cold storage door 3d is provided on the side opposite to the position where the air conditioner 10 is installed in the cold storage 3. Therefore, the inside of the cold storage 3 has a front portion close to the air conditioner 10 and a rear portion close to the cold storage door 3d. In the cold storage 3, it is possible to create a temperature difference between the front portion and the rear portion of the cold storage 3 by partitioning the inside of the cold storage 3 front and rear using a curtain.

Figure 2:
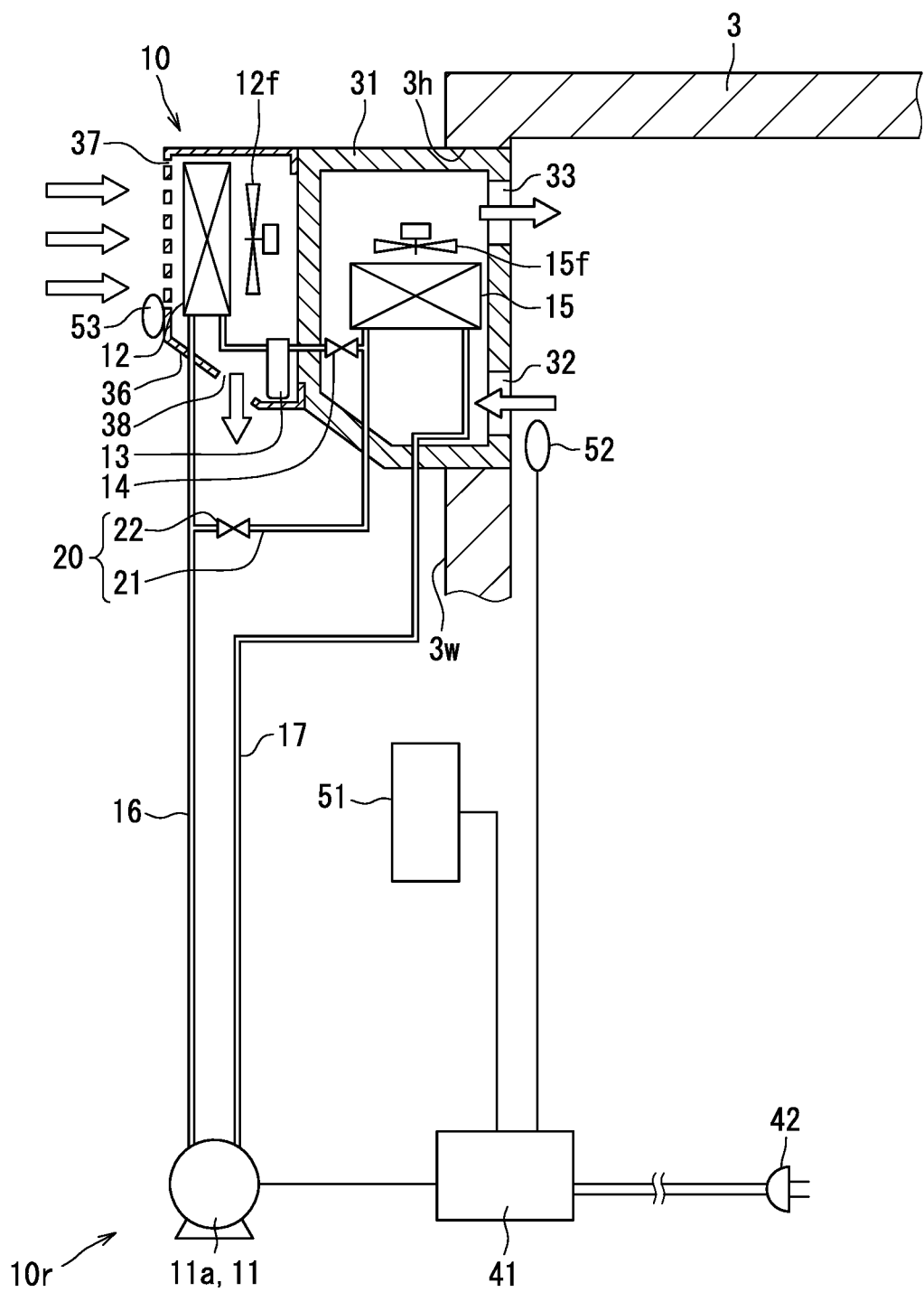
FIG. 2 is a cross-sectional view showing a schematic configuration of the cold storage and an air conditioner.

FIG. 2 is a cross-sectional view showing the vicinity of the air conditioner 10 when the electric compressor 11a is used as the compressor 11 of the refrigeration cycle device 10r. When the engine driven compressor 11b is used as the compressor 11, power is supplied from the engine to the engine driven compressor 11b instead of the power supply control unit 41 to drive the compressor 11.

The air conditioner 10 includes the refrigeration cycle device 10r having the compressor 11, a condenser 12, an expansion valve 14, and an evaporator 15. The compressor 11 compresses the gas phase refrigerant to bring the gas phase refrigerant into a high temperature and high pressure state. The condenser 12 lowers the temperature of the gas phase refrigerant compressed by the compressor 11 to condenses into the liquid phase refrigerant. The condenser 12 is a heat exchanger that heats the surrounding air by exchanging heat between the refrigerant and the surrounding air.

The expansion valve 14 expands the liquid phase refrigerant condensed by the condenser 12 to lower the temperature and pressure such that the liquid phase refrigerant is easily evaporated. Instead of the variable throttle valve such as the expansion valve 14, a fixed throttle such as a capillary tube or an orifice may be used to reduce the pressure of the refrigerant. The expansion valve 14 provides an example of a pressure reducing device. The evaporator 15 evaporates the liquid phase refrigerant expanded by the expansion valve 14. The evaporator 15 is a heat exchanger that cools the surrounding air by exchanging heat between the refrigerant and the surrounding air.

The refrigeration cycle device 10r includes a high-pressure pipe 16 that connects the compressor 11 to the condenser 12 and the expansion valve 14 to form a flow path for the refrigerant. A high-pressure refrigerant that has been compressed by the compressor 11 and decompressed by the expansion valve 14 flows through the high-pressure pipe 16. The refrigeration cycle device 10r includes a low-pressure pipe 17 that connects the expansion valve 14 to the evaporator 15 and the compressor 11 to form a flow path for the refrigerant. A low-pressure refrigerant that has been decompressed by the expansion valve 14 and compressed by the compressor 11 flows through the low-pressure pipe 17. The high-pressure pipe 16 and the low-pressure pipe 17 form an annular flow path for the refrigerant.

A liquid receiver 13 is provided between the condenser 12 and the expansion valve 14 in the high-pressure pipe 16. The liquid receiver 13 separates the gas phase refrigerant and the liquid phase refrigerant from each other. Therefore, only the liquid phase refrigerant flows through the expansion valve 14 located downstream of the liquid receiver 13 in the refrigerant flow.

The air conditioner 10 includes an evaporator case 31 that partitions the evaporator 15, which becomes low temperature when the compressor 11 is driven, from the surroundings. The evaporator case 31 is made of a heat insulating panel having high heat insulating performance. The evaporator case 31 is fitted and fixed to the opening 3h provided in the upper part of the front wall 3w of the cold storage 3. The expansion valve 14 is located inside the evaporator case 31.

An evaporator fan 15f is provided inside the evaporator case 31. The evaporator fan 15f facilitates heat exchange by flowing air around the evaporator 15. The evaporator case 31 has an inside air suction port 32 and an inside air outlet 33. The inside air suction port 32 and the inside air outlet 33 communicate with each other between the inside of the evaporator case 31 and the inside of the cold storage 3. When the evaporator fan 15f is rotating, the inside air, which is the air inside the cold storage 3, is sucked into the evaporator case 31 from the inside air suction port 32. When the evaporator fan 15f is rotating, the air inside the evaporator case 31 is blown out from the inside air outlet 33 into the cold storage 3. The evaporator fan 15f has a function of blowing cold air after heat exchange with the evaporator 15 into the cold storage 3.

The air conditioner 10 includes a condenser case 36 that partitions the condenser 12 that becomes hot when the compressor 11 is driven from the surroundings. The condenser case 36 is provided adjacent to the evaporator case 31 and in front of the evaporator case 31. In other words, the condenser case 36 is provided on the surface of the evaporator case 31 opposite to the surface communicating with the inside of the cold storage 3.

The condenser fan 12f is provided inside the condenser case 36. The condenser fan 12f facilitates heat exchange by flowing air around the condenser 12. The condenser case 36 has an outside air suction port 37 and an outside air outlet 38. The outside air suction port 37 and the outside air outlet 38 communicate the inside of the condenser case 36 with the outside space. When the condenser fan 12f is rotating, the outside air, which is the air in the external space, is sucked into the condenser case 36 from the outside air suction port 37. When the condenser fan 12f is rotating, the air inside the condenser case 36 is blown out from the outside air outlet 38 to the outside space. The outside air suction port 37 functions as a suction port for sucking air flowing in the direction opposite to the traveling direction of the vehicle 2 into the condenser case 36 while the vehicle 2 is traveling.

The air conditioner 10 includes a defrosting device 20. The defrosting device 20 includes a hot gas pipe 21 and a hot gas valve 22. The hot gas pipe 21 connects the high pressure pipe 16 and the evaporator 15 and guides the high temperature and high pressure gas phase refrigerant before flowing through the condenser 12 to the inside of the evaporator 15. The hot gas valve 22 is a valve device for adjusting the flow rate of the refrigerant that can flow through the hot gas pipe 21. The hot gas valve 22 is a solenoid valve whose opening degree can be electrically adjusted.

By driving the compressor 11 with the hot gas valve 22 open, a high-temperature and high-pressure gas refrigerant can flow through the evaporator 15. As a result, the frost generated on the surface of the evaporator 15 can be melted and defrosted. When defrosting is not required, the hot gas valve 22 is closed to shut off the flow of the refrigerant in the hot gas pipe 21. As a result, the low-temperature low-pressure liquid-phase refrigerant that has passed through the condenser 12 and the expansion valve 14 can flow through the evaporator 15. In other words, by controlling the opening degree of the hot gas valve 22, the evaporator 15 can be switched between a high temperature state and a low temperature state.

The defrosting device 20 is not limited to the above configuration in which the hot gas pipe 21 and the hot gas valve 22 are used to flow a high temperature and high pressure gas phase refrigerant to the evaporator 15. As the defrosting device 20, for example, an electric heater provided in the vicinity of the evaporator 15 can be adopted. In this case, it is easier to design the defrosting device 20 to be smaller than when the hot gas pipe 21 or the hot gas valve 22 is used. In addition, the defrosting ability can be adjusted by controlling the output of the electric heater. Therefore, it is easy to shorten the time required for defrosting as compared with the case where the hot gas pipe 21 and the hot gas valve 22 are used. As the defrosting method, the two methods, e.g., the method using the hot gas and the method using the electric heater, or another defrosting method may be used in combination.

The air conditioner 10 includes the power supply control unit 41 and the power cable 42. The power supply control unit 41 controls the electric power supplied to the vehicle 2 and the air conditioner 10. The power cable 42 receives power supply from an external power source. The power cable 42 is connectable to a commercial AC power supply. The power supply control unit 41 has a function of converting AC power supplied by using the power cable 42 into DC power. The power supply control unit 41 has a function of stepping up or stepping down the magnitude of the supplied voltage to convert it into a desired voltage.

The air conditioner 10 includes an operation panel 51, a refrigerator inside temperature sensor 52, and an outside temperature sensor 53. The operation panel 51 is used for the occupant to set a set temperature or the like in the air-conditioning operation. The operation panel 51 includes a defrost button. The defrost button notifies the occupant whether or not defrosting is in progress by lighting the button. By operating the defrost button during defrosting, the defrosting can be forcibly stopped. Defrosting can be started by the occupant operating the defrosting button. The refrigerator inside temperature sensor 52 measures the internal temperature, which is the temperature inside the refrigerator 3. The refrigerator inside temperature sensor 52 is provided in the vicinity of the inside air suction port 32. The installation position and number of the internal temperature sensors 52 in the refrigerator are not limited to the above examples. For example, plural internal temperature sensors may be provided at two locations, a front portion and a rear portion of the cold storage 3, to measure plural internal temperatures. The outside temperature sensor 53 measures the outside air temperature, which is the temperature of the external space. The outside temperature sensor 53 is provided in the vicinity of the outside air suction port 37.

Figure 3:
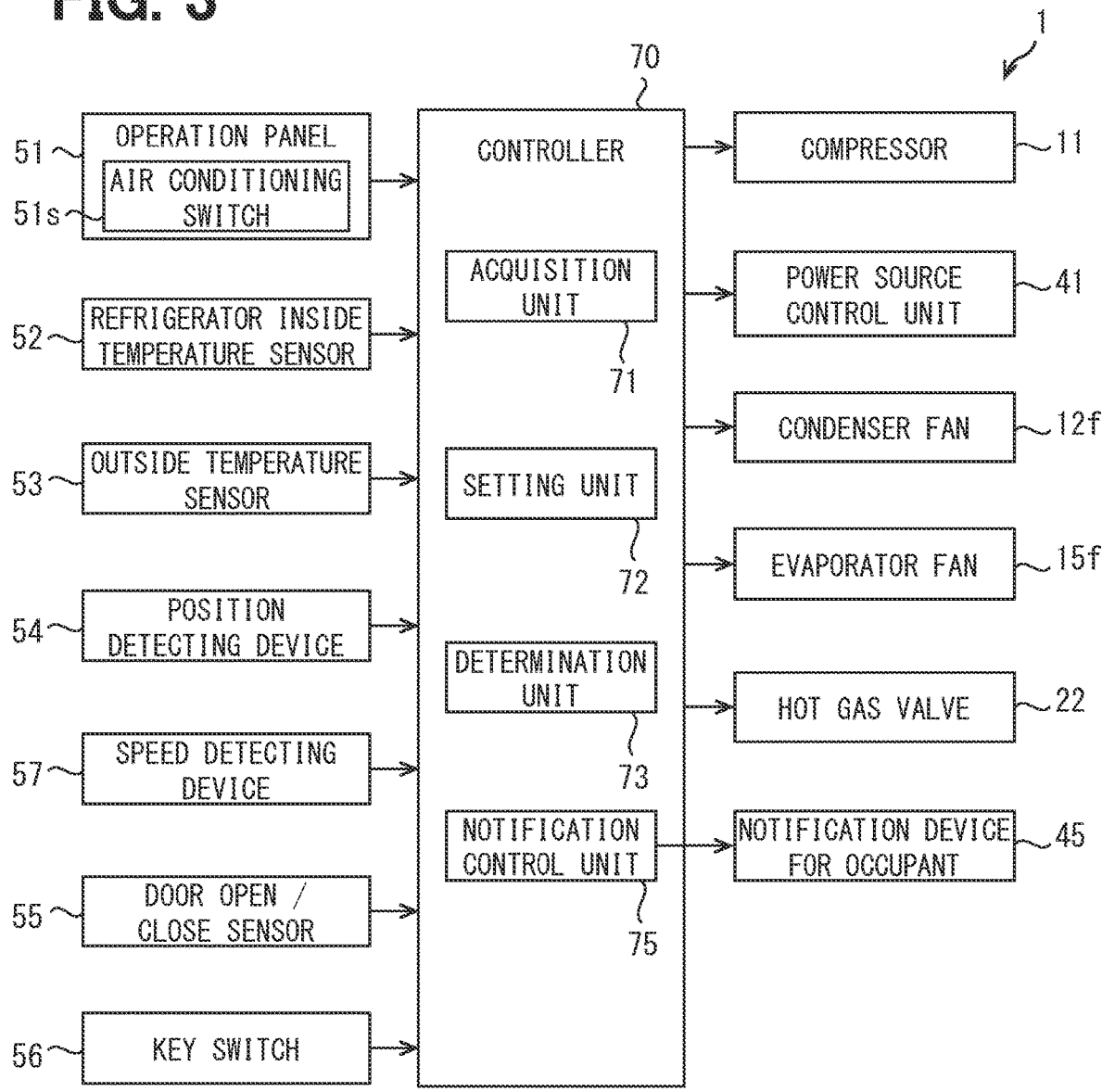
FIG. 3 is a block diagram relating to control of an air-conditioning system.

In FIG. 3, the controller 70 is connected to the operation panel 51, the refrigerator inside temperature sensor 52, and the outside temperature sensor 53. The operation panel 51 includes an air-conditioning switch 51s for switching on/off the air conditioner 10 by the operation by an occupant. The controller 70 acquires information such as a set temperature in the air-conditioning operation input by the operation panel 51. The controller 70 acquires the temperature inside the refrigerator measured by the refrigerator inside temperature sensor 52. The controller 70 acquires the outside air temperature measured by the outside temperature sensor 53.

The controller 70 is connected to the position detecting device 54, the speed detecting device 57, the door open/close sensor 55, and the key switch 56. The position detecting device 54 includes a GNSS (Global Navigation Satellite System) receiver used for, for example, GPS and GLONASS. The position detecting device 54 sequentially detects the current position of the vehicle 2 as position information based on the positioning signal received from the positioning satellite. The current position is represented by coordinates including latitude and longitude. Further, the coordinates indicating the current position may include the altitude. The controller 70 acquires the current position measured by the position detecting device 54. The position detecting device 54 may employ a device that detects the current position by a method different from that of the GNSS receiver, such as a vehicle speed sensor, a gyro sensor, and an acceleration sensor. Further, the position detecting device 54 may include plural devices capable of detecting the current position in combination. The controller 70 acquires the current position of the vehicle 2 detected by the position detecting device 54.

The speed detecting device 57 is a vehicle speed sensor that detects the moving speed of the vehicle 2. The speed detecting device 57 may detect the vehicle speed with an accuracy that can determine whether the vehicle 2 is moving or stopped. The controller 70 acquires the speed of the vehicle 2 detected by the speed detecting device 57.

The door open/close sensor 55 detects the open/closed state of the cold storage door 3d. The controller 70 acquires the open/closed state of the cold storage door 3d detected by the door open/close sensor 55. The controller 70 acquires the detection result of the door open/close sensor 55, for example, every 30 seconds. The key switch 56 switches the state of the vehicle 2 among an ignition state, an accessory state, and an off state. The controller 70 acquires the state of the vehicle 2 switched by the key switch 56.

The controller 70 is connected to the compressor 11, the power supply control unit 41, the condenser fan 12f, the evaporator fan 15f, and the hot gas valve 22. The controller 70 controls the drive of the compressor 11 to control the amount of the refrigerant circulating in the refrigeration cycle device 10r. The controller 70 controls the drive of the power supply control unit 41. The controller 70 controls the drive of the condenser fan 12f to control the amount of air flowing around the condenser 12. The controller 70 controls the drive of the evaporator fan 15f to control the amount of air flowing around the evaporator 15. The controller 70 controls the opening degree of the hot gas valve 22 to switch between a state in which the evaporator 15 is defrosted and a state in which the evaporator 15 is not defrosted.

The controller 70 is connected to the occupant notification device 45. The occupant notification device 45 notifies the occupant of the vehicle 2 of an error notification or the like related to the air-conditioning operation. The error notification includes notifying that the temperature inside the refrigerator is not an appropriate temperature. The occupant notification device 45 performs error notification when, for example, the temperature inside the refrigerator is too high or too low with respect to the set temperature. The occupant notification device 45 has, for example, a display device such as a display screen that visually notifies the occupant. The occupant notification device 45 has, for example, a sounding device such as a buzzer that notifies the occupant by sound. The occupant notification device 45 has, for example, a vibration generator that notifies the occupant by vibration. The occupant notification device 45 may perform notification by plural notification methods, such as by combining the screen display and the sound. The occupant notification device 45 provides an example of a notification device.

The controller 70 includes an acquisition unit 71, a setting unit 72, and a determination unit 73. The acquisition unit 71 acquires various information regarding the air-conditioning operation. The acquisition unit 71 acquires, for example, the set temperature. The acquisition unit 71 acquires, for example, the temperature inside the refrigerator. The acquisition unit 71 acquires, for example, the outside air temperature. The acquisition unit 71 acquires, for example, the current position of the vehicle 2. The acquisition unit 71 acquires, for example, the open/closed state of the cold storage door 3d. The acquisition unit 71 acquires, for example, whether the vehicle 2 is in the ignition state, the accessory state, or the off state.

The setting unit 72 sets various conditions related to the notification control. The setting unit 72 sets an appropriate temperature range of the internal temperature, for example, based on the set temperature. The determination unit 73 makes a determination regarding the notification control. In other words, the determination unit 73 determines whether or not the condition set by the setting unit 72 is satisfied based on the information of the vehicle 2 acquired by the acquisition unit 71.

The controller 70 includes a notification control unit 75. The notification control unit 75 controls the notification using the occupant notification device 45 based on the determination result of the determination unit 73. For example, when it is determined that error notification should be performed, the notification control unit 75 performs the error notification until it is determined that error notification should be stopped.

Figure 4:
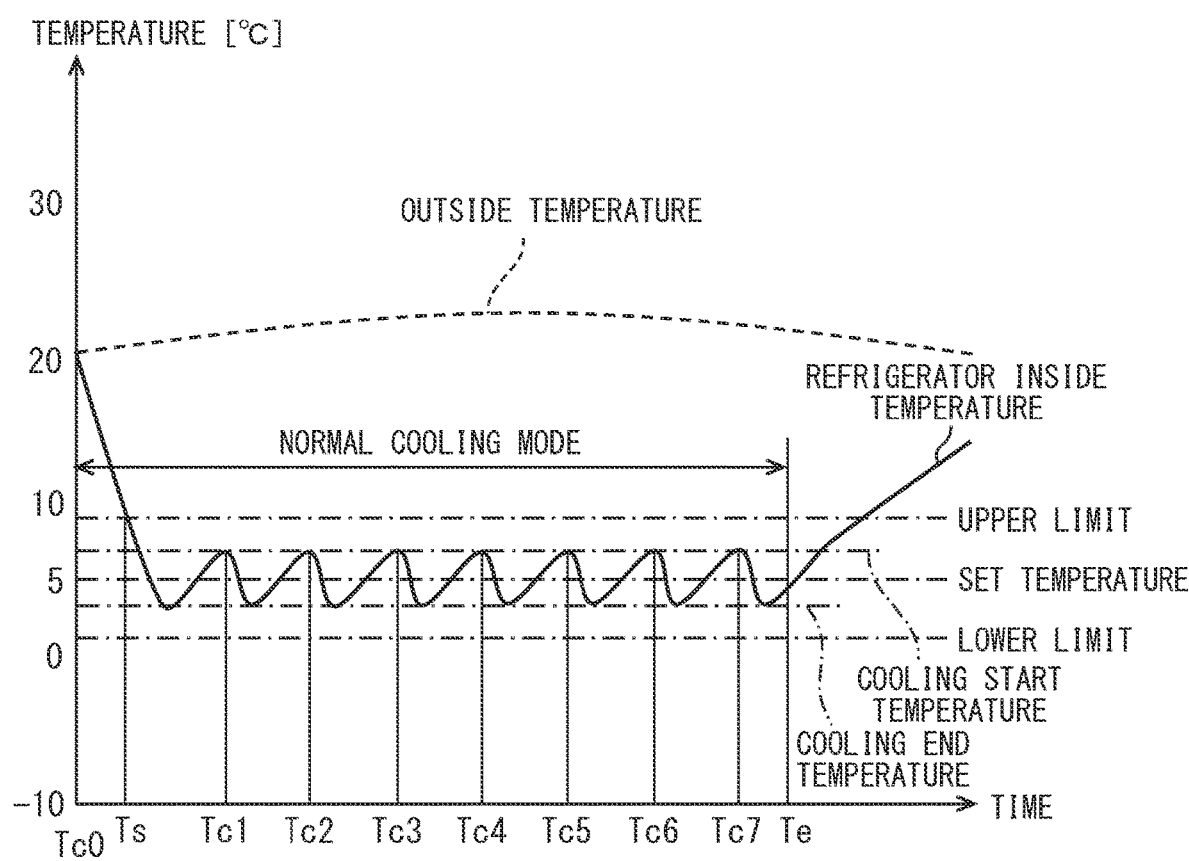
FIG. 4 is a graph showing changes in temperature inside the cold storage over time.

An example of the air-conditioning operation of the air conditioner 10 when the error notification is not included will be described below with reference to the graph. An example of the air-conditioning operation of the air conditioner 10 in the case of including the error notification will be described later. In FIG. 4, the horizontal axis represents time and the vertical axis represents temperature. The graph is shown by taking the case where the set temperature of the air conditioner 10 is 5° C. and the outside air temperature is about 20° C. as an example.

At Tc0, which is a timing to start the air-conditioning operation, the cooling operation is started by driving the compressor 11, the condenser fan 12f, and the evaporator fan 15f. As a result, the refrigerator inside temperature, which was the temperature equivalent to the outside air temperature, decreases and gradually approaches the set temperature of 5° C. After that, by detecting that the refrigerator inside temperature has dropped to the cooling end temperature set lower than the set temperature, the drive of the compressor 11, the condenser fan 12f, and the evaporator fan 15f is stopped to stop the cooling operation. The cooling end temperature is, for example, 3° C.

While the cooling operation is stopped, the refrigerator inside temperature gradually rises due to the influence of the outside air temperature, which is higher than the refrigerator inside temperature. While the cooling operation is stopped, the evaporator 15 is defrosted as needed. After that, when it is detected that the refrigerator inside temperature has risen to the cooling start temperature set to a temperature higher than the set temperature, the cooling operation is restarted. The cooling start temperature is, for example, 7° C. After Tc0, the timing at which the cooling operation is first restarted is Tc1.

After that, the cooling operation is repeatedly executed and stopped, and the air-conditioning operation is performed so that the refrigerator inside temperature falls within the temperature range from the cooling end temperature to the cooling start temperature. However, the air-conditioning operation of the air conditioner 10 may be performed by inverter control that appropriately changes the rotation speed of the compressor 11 according to the cooling load. In this case, instead of repeating the execution and the stop of the cooling operation, the cooling operation is continued while adjusting the cooling capacity so that the internal temperature maintains the set temperature.

Te is a timing when the vehicle arrives at the final unloading site, which is the place where the low-temperature transportation ends. At the timing Te, the operation panel 51 is operated by the occupant, and the power of the air conditioner 10 is turned off. After the power of the air conditioner 10 is turned off, the cooling operation by the air conditioner 10 is not performed. Therefore, after Te, the refrigerator inside temperature rises beyond the cooling start temperature, and rises to a temperature close to the outside air temperature. The final unloading site provides an example of an unloading site.

Figure 5:
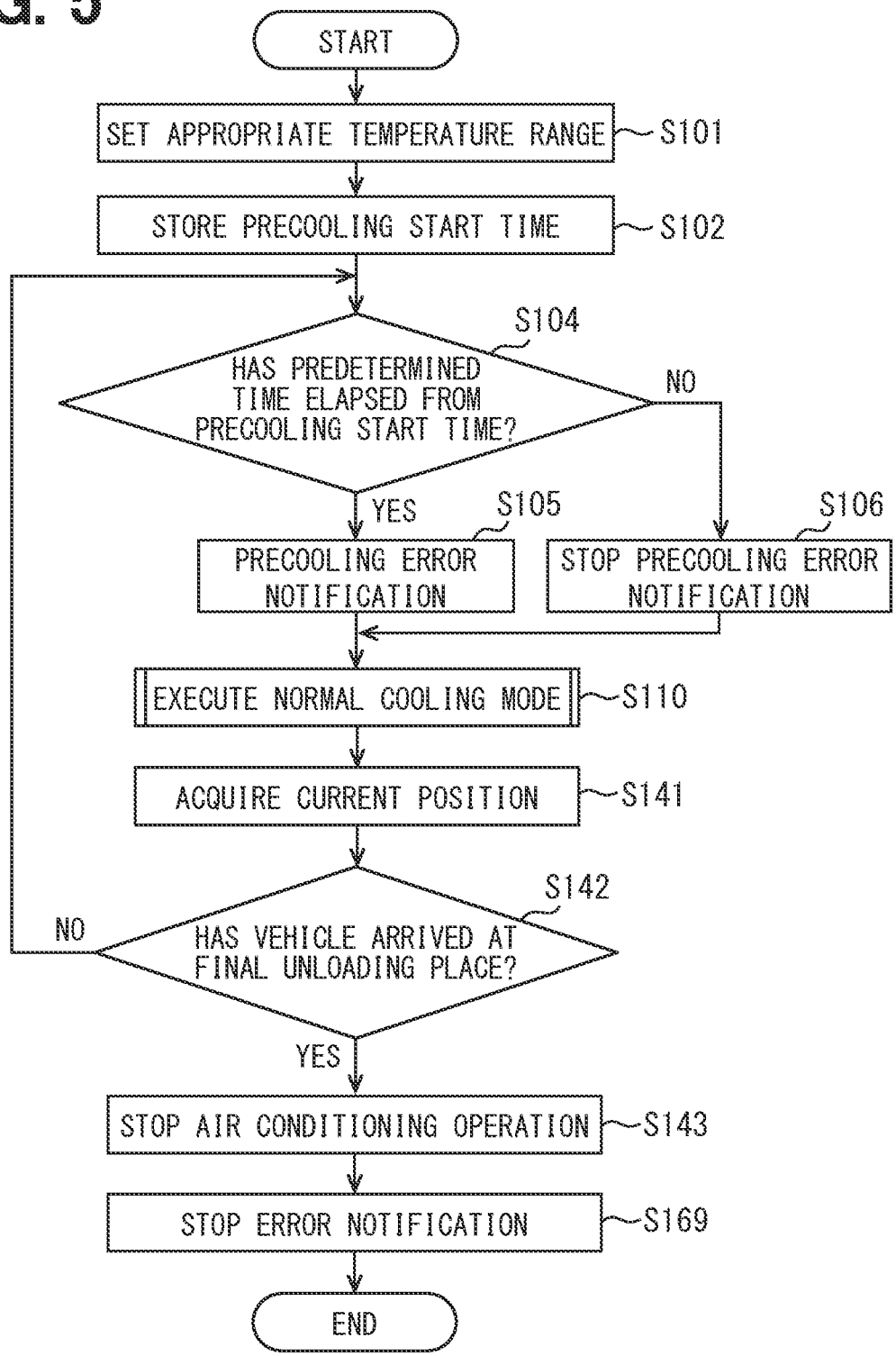
FIG. 5 is a flowchart relating to control of an air-conditioning system.

An example of air-conditioning control by the air conditioner 10 will be described below with reference to the flowchart. In FIG. 5, when the air-conditioning operation is started by operating the operation panel 51 by the occupant, the appropriate temperature range is set in step S101. The appropriate temperature range is a temperature range allowed for the inside of the cold storage 3. If the refrigerator inside temperature is within the appropriate temperature range, the air conditioner 10 is in a normal state. If the refrigerator inside temperature is outside the appropriate temperature range, there is a possibility that an abnormality has occurred in the air conditioner 10 or the like. Therefore, if the refrigerator inside temperature is outside the appropriate temperature range, an error notification may be given to the occupant. Step S101 provides an example of a temperature setting step.

The appropriate temperature range is defined by the upper and lower limits. The upper limit is, for example, a temperature higher than the cooling start temperature. The lower limit is, for example, a temperature lower than the cooling end temperature. The set temperature set by the occupant is within the appropriate temperature range. If the set temperature is 5° C., the cooling start temperature is 7° C., and the cooling end temperature is 3° C., the upper limit value can be set to 9° C. and the lower limit value can be set to 1° C. However, the values such as the set temperature can be appropriately set by the occupant according to the purpose of low temperature transportation and the external environment such as the outside air temperature. After setting the appropriate temperature range, the process proceeds to step S102.

In step S102, a pre-cooling start time is stored. The pre-cooling start time is a time when the air-conditioning operation is started in order to keep the refrigerator inside temperature within the appropriate temperature range. The pre-cooling includes an air-conditioning operation that lowers the refrigerator inside temperature from the outside air temperature to a temperature below the upper limit in order to start the low temperature transportation. The pre-cooling includes an air-conditioning operation in which the refrigerator inside temperature, which has temporarily risen to the temperature equivalent to the outside air temperature due to the opening of the cold storage door 3d for unloading, is lowered to a temperature below the upper limit. The timing at which the cold storage door 3d, which was open while maintaining the air-conditioning operation, is closed can be regarded as the start timing of pre-cooling. In the air-conditioning operation, the same control may be performed or different controls may be performed depending on whether the pre-cooling is in progress or not. If the refrigerator inside temperature is already within the appropriate temperature range when the pre-cooling is started, the pre-cooling start time to be memorized does not exist. Since the pre-cooling start time is stored, it can be determined that pre-cooling is in progress. After storing the pre-cooling start time, the process proceeds to step S104.

In step S104, it is determined whether a predetermined time has elapsed from the pre-cooling start time. Here, the predetermined time is, for example, 30 minutes. If a predetermined time has elapsed from the pre-cooling start time, it is determined that the air conditioner 10 may not be functioning properly, and the process proceeds to step S105. If a predetermined time has not elapsed from the pre-cooling start time, it is determined that the air conditioner 10 is functioning properly, and the process proceeds to step S106. If the pre-cooling start time is not stored, it is determined that the air conditioner 10 is functioning properly and the process proceeds to step S106, as in the case where the predetermined time has not elapsed from the pre-cooling start time.

In step S105, a pre-cooling error notification is performed. The pre-cooling error notification is an error notification that notifies that the pre-cooling has not been completed within a predetermined time. The pre-cooling error notification is an example of error notification. There are various possible reasons why the pre-cooling is not completed within the specified time. One reason is that the cold storage door 3d is open, and it is assumed that high-temperature outside air has flowed into the cold storage 3. As another reason, it is assumed that the air conditioner 10 has failed and the cooling operation cannot be started. As another reason, it is assumed that the appropriate temperature range is too low with respect to the outside air temperature, which exceeds the cooling capacity of the air conditioner 10. Step S105 provides an example of a notification step.

In the pre-cooling error notification, a warning message indicating that the pre-cooling is not completed within a predetermined time is displayed on the display screen of the occupant notification device 45. Further, a warning sound is emitted from the sounding device of the occupant notification device 45. As a result, the occupant is notified that an error has occurred and the content of the error that has occurred. Upon receiving the pre-cooling error notification, the occupant can cope with the temperature abnormality by confirming whether the cold storage door 3*d* is closed and whether the power of the air conditioner 10 is on. Further, if there is a cooling method other than the air conditioner 10, it is possible to take measures to cool the object to be cooled by using the cooling method. As a cooling method other than the air conditioner 10, for example, the cold storage 3 and a freezing warehouse are communicated with each other, and the cold air of the freezing warehouse is allowed to flow into the cold storage 3. After notifying the pre-cooling error, the process proceeds to step S110.

In step S106, the pre-cooling error notification is stopped. In other words, if the pre-cooling error notification is being performed, the pre-cooling error notification is stopped. If the pre-cooling error notification is not performed, the state in which the pre-cooling error notification is not performed is maintained. After stopping the pre-cooling error notification, the process proceeds to step S110.

Figure 6:
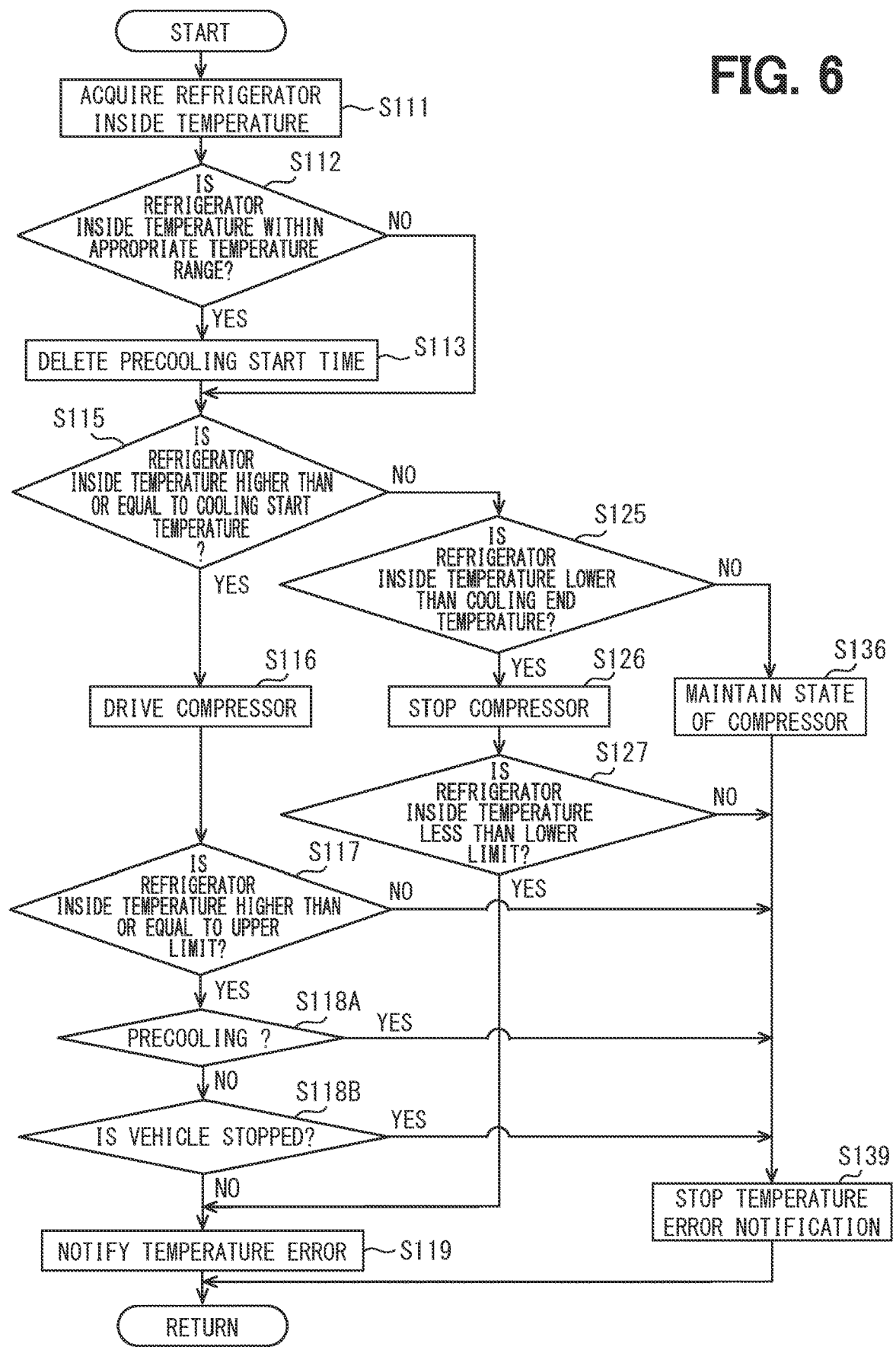
FIG. 6 is a flowchart relating to Step S110 in FIG. 5.

In step S110, a normal cooling mode is executed. After executing the normal cooling mode, the normal cooling mode is maintained and the process proceeds to step S141. The details of the normal cooling mode will be described below. In FIG. 6, when the normal cooling mode is started, the refrigerator inside temperature is acquired in step S111. As the refrigerator inside temperature, the temperature measured by the refrigerator inside temperature sensor 52 inside the refrigerator is acquired. After acquiring the refrigerator inside temperature, the process proceeds to step S112. Step S111 provides an example of a temperature acquiring step.

In step S112, it is determined whether the refrigerator inside temperature is within the appropriate temperature range. If the refrigerator inside temperature is within the appropriate temperature range, it is determined that the pre-cooling is completed, and the process proceeds to step S113. If the refrigerator inside temperature is out of the appropriate temperature range, it is determined that the pre-cooling is in progress, and the process proceeds to step S115.

In step S113, the pre-cooling start time is deleted. In other words, when the pre-cooling start time is stored, the pre-cooling start time is deleted so that the pre-cooling start time is not stored. As a result, the pre-cooling is completed and the pre-cooling is not in progress. On the other hand, if the pre-cooling start time is not stored, the state in which the pre-cooling start time is not stored is maintained. If the pre-cooling error is notified, the pre-cooling error notification is stopped. After deleting the pre-cooling start time, the process proceeds to step S115.

In step S115, it is determined whether the refrigerator inside temperature is equal to or higher than the cooling start temperature. If the refrigerator inside temperature is equal to or higher than the cooling start temperature, it is determined that it is necessary to cool the cold storage 3, and the process proceeds to step S116. On the other hand, when the refrigerator inside temperature is lower than the cooling start temperature, it is determined that further determination is necessary as to whether the cold storage 3 needs to be cooled, and the process proceeds to step S125.

In step S116, the compressor 11 is driven. If the compressor 11 is in the stopped state, the compressor 11 is started to be driven. On the other hand, when the compressor 11 is already being driven, the state in which the compressor 11 is being driven is maintained. Along with driving the compressor 11, the condenser fan 12*f* is driven. This promotes heat dissipation to the surrounding air by the condenser 12. In addition, the compressor 11 is driven and the evaporator fan 15*f* is driven. As a result, heat absorption from the surrounding air by the evaporator 15 is promoted, and cold air is blown into the cold storage 3. The state in which the compressor 11, the condenser fan 12*f*, and the evaporator fan 15*f* are driven is maintained, and the process proceeds to step S117.

In step S117, it is determined whether the refrigerator inside temperature is equal to or higher than the upper limit value. If the refrigerator inside temperature is equal to or higher than the upper limit, the process proceeds to step S118A. On the other hand, if the refrigerator inside temperature is less than the upper limit value, it is determined that no error to be notified has occurred, and the process proceeds to step S139. Step S117 provides an example of a temperature determining step.

In step S118A, it is determined whether the pre-cooling is in progress, by determining whether or not the pre-cooling start time is stored. The state in which the pre-cooling start time is recorded is maintained from the start of pre-cooling until the refrigerator inside temperature falls within the appropriate temperature range. After the refrigerator inside temperature falls within the appropriate temperature range, the pre-cooling start time is deleted, and the state in which the pre-cooling start time is not recorded is maintained. Therefore, when the pre-cooling start time is stored, it can be determined that the pre-cooling is in progress, that is, before the pre-cooling is completed. On the other hand, when the pre-cooling start time is not stored, it can be determined that the pre-cooling is not in progress, that is, after the pre-cooling is completed. If the pre-cooling is in progress, it is determined that it is not necessary to notify the error, and the process proceeds to step S139. On the other hand, if the pre-cooling is not in progress, the process proceeds to step S118B. Step S118A provides an example of the pre-cooling determining step.

The reason why it can be determined that it is not necessary to notify the error will be described below even if the refrigerator inside temperature is above the upper limit value during the pre-cooling. The cold storage 3 used for low-temperature transportation only needs to keep the refrigerator inside temperature low while the object to be cooled is stored, and it is necessary to keep the refrigerator inside temperature low when the object to be cooled is not stored. For this reason, in a state where the object to be cooled is not stored, such as before the start of low-temperature transportation or after the end of low-temperature transportation, the refrigerator inside temperature is generally a temperature equivalent to the outside air temperature. Here, it is preferable that the temperature of the object to be cooled is controlled when it is stored in the cold storage 3. Therefore, before storing the object to be cooled in the cold storage 3, it is necessary to perform the pre-cooling in which the inside of the cold storage 3 is cooled in advance.

The pre-cooling can be performed by driving the air conditioner 10 and starting the air-conditioning operation. Further, the pre-cooling may be executed by communicating the cold storage 3 with the freezing warehouse and allowing the cold air of the freezing warehouse to flow inside the cold storage 3. Further, the pre-cooling may be performed by using both the air-conditioning operation by the air conditioner 10 and the inflow of cold air from the freezer warehouse.

The pre-cooling will continue until the refrigerator inside temperature falls within the appropriate temperature range. Therefore, while the air conditioner 10 is driven to perform the pre-cooling, the refrigerator inside temperature is naturally equal to or higher than the upper limit value. Of course, the occupant who is the user of the air conditioner 10 performing the pre-cooling can also recognize that the refrigerator inside temperature is higher than the upper limit value during the pre-cooling. Therefore, it can be said that it is not necessary to notify the contents already recognized by the occupants as an error.

In step S118B, it is determined whether the vehicle 2 is stopped. In other words, it is determined whether the vehicle 2 is moving based on the vehicle speed detected by the speed detecting device 57. If the vehicle speed is zero, it can be determined that the vehicle is stopped. On the other hand, if the vehicle speed is not zero, it can be determined that the vehicle is not stopped. The method for determining whether the vehicle is stopped is not limited to the method using the speed detecting device 57. For example, if the current position detected by the position detecting device 54 is the same as the position immediately before, it can be determined that the vehicle is stopped. For example, if the key switch 56 is in the off state, it can be determined that the vehicle is stopped. For example, if the shift lever of the vehicle 2 is in the parked state, it can be determined that the vehicle is stopped. If the vehicle 2 is stopped, it is determined that it is not necessary to notify the error, and the process proceeds to step S139. On the other hand, if the vehicle 2 is not stopped, the process proceeds to step S119. Step S118B provides an example of a moving determining step.

The reason why it can be determined that it is not necessary to notify the error even if the refrigerator inside temperature is equal to or higher than the upper limit value when the vehicle 2 is stopped will be described below. The vehicle 2 may start moving from the starting point where the low temperature transportation is started, and may move to the final unloading place while passing through plural unloading places. In this case, unloading is performed to carry out the object to be cooled at plural unloading sites before arriving at the final unloading site. During unloading, it is necessary to stop the vehicle 2 and open the cold storage door 3*d*. Therefore, outside air tends to flow into the cold storage 3 during unloading, and the temperature inside the storage tends to rise.

The occupant of the vehicle 2 stopped for unloading naturally recognizes that the refrigerator inside temperature may rise due to the unloading. Therefore, it can be said that it is not necessary to re-notify the rise in the refrigerator inside temperature due to unloading, which is already recognized by the occupants, as an error.

In step S125, it is determined whether the refrigerator inside temperature is lower than the cooling end temperature. If the refrigerator inside temperature is lower than the cooling end temperature, it is determined that it is not necessary to cool the cold storage 3, and the process proceeds to step S126. On the other hand, if the refrigerator inside temperature is lower than the cooling end temperature, it is determined that the current state should be maintained, and the process proceeds to step S136.

In step S126, the compressor 11 is stopped. If the compressor 11 is in the driving state, the compressor 11 is made to stop. On the other hand, when the compressor 11 is already stopped, the state in which the compressor 11 is stopped is maintained. The compressor 11 is stopped and the condenser fan 12*f* is stopped. As a result, the heat exchange between the condenser 12 and the surrounding air is reduced. Further, the compressor 11 is stopped and the evaporator fan 15*f* is stopped. As a result, the heat exchange between the evaporator 15 and the surrounding air is reduced, and the cold air blown into the cold storage 3 is stopped. The state in which the compressor 11, the condenser fan 12*f*, and the evaporator fan 15*f* are stopped is maintained, and the process proceeds to step S127.

In step S127, it is determined whether the refrigerator inside temperature is less than the lower limit. If the refrigerator inside temperature is less than the lower limit, the process proceeds to step S119. On the other hand, when the refrigerator inside temperature is equal to or higher than the lower limit, it is determined that no error to be notified has occurred, and the process proceeds to step S139.

In step S136, the state of the compressor 11 is maintained. If the compressor 11 is in the driving state, the driving state of the compressor 11 is maintained. On the other hand, if the compressor 11 is in the stopped state, the stopped state of the compressor 11 is maintained. Further, the condenser fan 12*f* and the evaporator fan 15*f* also maintain the immediately preceding states as in the compressor 11. The compressor 11, the condenser fan 12*f*, and the evaporator fan 15*f* are maintained in the immediately preceding states, and the process proceeds to step S139.

In step S119, the temperature error notification is performed. The temperature error notification is an error notification indicating that the refrigerator inside temperature is not within the appropriate temperature range. The temperature error notification includes notification that the refrigerator inside temperature is higher than the upper limit value. The temperature error notification includes notification that the refrigerator inside temperature is lower than the lower limit. The temperature error notification is an example of error notification. Step S119 provides an example of a notification step.

As an example in which the temperature error notification is performed, it is assumed that the occupant makes an operation error of the air-conditioning switch 51*s*. More specifically, when unloading at the unloading site, the inside of the cold storage 3 may be cooled by turning off the power of the air conditioner 10 and allowing cold air from the freezer warehouse to flow into the cold storage 3. After that, when the unloading is completed and the air conditioner 10 is forgotten to be turned on and the movement to the next unloading place is started, the refrigerator inside temperature gradually rises due to the influence of the outside air temperature. As a result, it is assumed that the refrigerator inside temperature exceeds the upper limit and the temperature error notification is performed.

In the temperature error notification, a warning message indicating that the current temperature inside the refrigerator is not within the appropriate temperature range is displayed on the display screen of the occupant notification device 45. Further, a warning sound is emitted from the sounding device of the occupant notification device 45. As a result, the occupant is notified that an error regarding the temperature of the cold storage 3 has occurred. Upon receiving the temperature error notification, the occupant can cope with the temperature abnormality by confirming whether or not the cold storage door 3*d* is closed and whether or not the power of the air conditioner 10 is on. After the temperature error notification is performed, the state of the compressor 11 and the state in which the temperature error notification is performed are maintained, and the control change in the normal cooling mode is terminated.

The error notification may be suppressed or may be forcibly stopped by operating the operation panel 51. According to this, it is possible to restrict the error notification from being maintained until the refrigerator inside temperature actually falls within the appropriate temperature range after the occupant has taken measures to eliminate the abnormality.

In step S139, the temperature error notification is stopped. In other words, if the temperature error notification is being performed, the temperature error notification is stopped. On the other hand, when the temperature error notification is not performed, the state in which the temperature error notification is not performed is maintained. After stopping the temperature error notification, the state of the compressor 11 and the state in which the temperature error notification is stopped are maintained, and the control change in the normal cooling mode is terminated. Step S139 provides an example of a notification step.

In step S141 of FIG. 5, the current position of the vehicle 2 is acquired. The current position of the vehicle 2 can be acquired from the position information detected by using the position detecting device 54. After acquiring the current position of the vehicle 2, the process proceeds to step S142.

In step S142, it is determined whether the vehicle 2 has arrived at the final unloading place. When the vehicle 2 has arrived at the final unloading place, it is determined that it is not necessary to perform the error notification, and the process proceeds to step S143. On the other hand, when the vehicle 2 has not arrived at the final unloading place, the process returns to step S104 and the air-conditioning operation is maintained until the vehicle 2 arrives at the final unloading place. Step S142 provides an example of a position determining step.

The reason why it can be determined that it is not necessary to notify the error even if the refrigerator inside temperature is not within the appropriate temperature range after the vehicle 2 has arrived at the final unloading site will be described below. When the vehicle 2 arrives at the final unloading site and completes the unloading, the vehicle 2 is in a state in which the object to be cooled is not stored in the cold storage 3. In other words, there is no temperature control target for low temperature transportation. Therefore, it can be said that it is not necessary to notify the occupant of the rise in the refrigerator inside temperature as an error.

In step S143, the air-conditioning operation by the air conditioner 10 is stopped. However, the defrosting operation may be executed before the air conditioner 10 is stopped, and the air-conditioning operation may be stopped after the control for the next air-conditioning operation is completed. After stopping the air-conditioning operation, the process proceeds to step S169.

In step S169, the error notification is stopped. If the temperature error notification is being performed, the temperature error notification is stopped. On the other hand, when the temperature error notification is not performed, the state in which the temperature error notification is not performed is maintained. After stopping the error notification, a series of air-conditioning control using the air conditioner 10 is terminated. Step S169 provides an example of a notification step.

Figure 7:
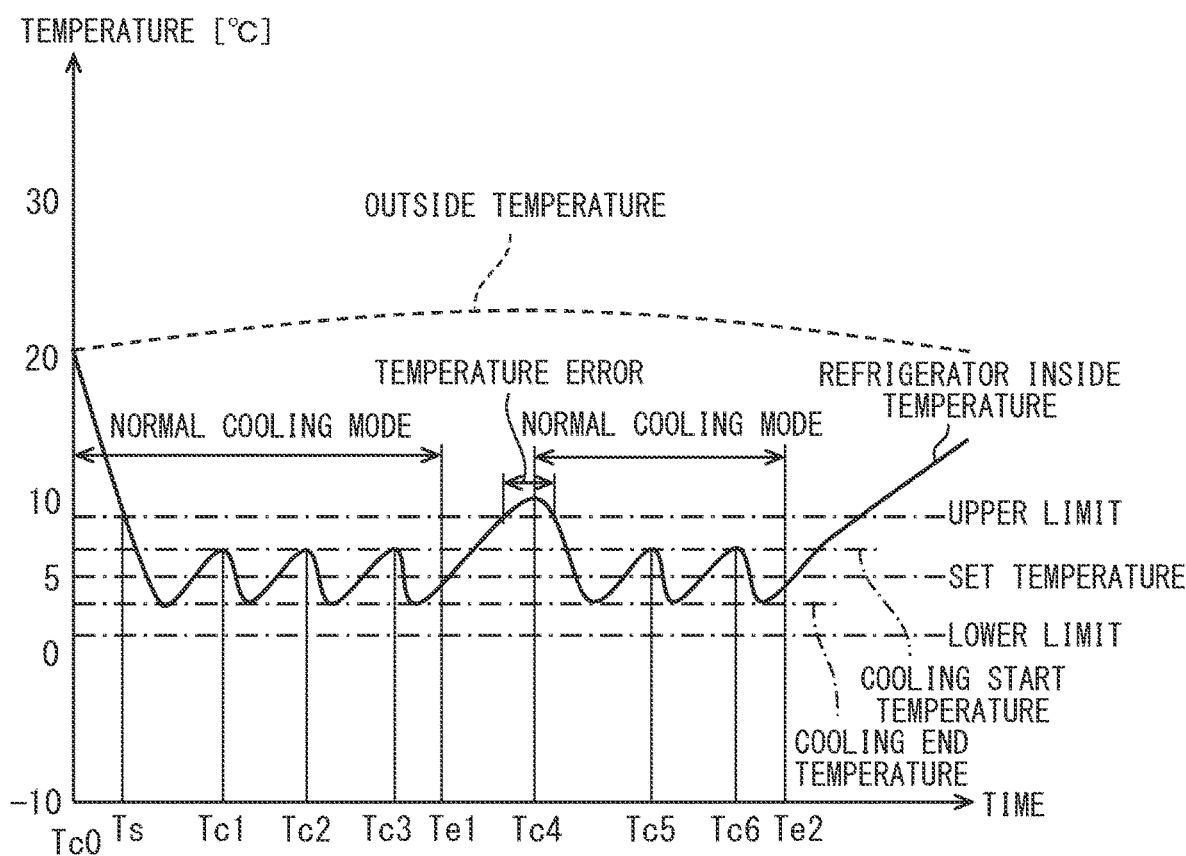
FIG. 7 is a graph showing changes in temperature inside the cold storage over time when an error notification is performed.

An example of the air-conditioning operation of the air conditioner 10 including the temperature error notification will be described below with reference to the graph. In FIG. 7, the horizontal axis represents time and the vertical axis represents temperature. The graph is shown by taking the case where the set temperature of the air conditioner 10 is 5° C. and the outside air temperature is about 20° C. as an example.

Tc0 is the timing at which the low temperature transportation is started, or the timing at which the cold storage door 3*d* opened for unloading is closed while executing the air-conditioning operation. In other words, Tc0 is the timing at which the air-conditioning operation is first started after the cold storage door 3*d* is opened and the refrigerator inside temperature rises to the outside air temperature exceeding the upper limit value. Ts is the timing at which the refrigerator inside temperature for the first time falls within the appropriate temperature range after the normal cooling mode is started. In other words, Ts is the timing when the refrigerator inside temperature for the first time falls below the upper limit value after starting the normal cooling mode. From Tc0 to Ts, it is in a pre-cooling state. Therefore, although the refrigerator inside temperature is higher than the upper limit, the temperature error notification is not performed. From Ts to Te1 after the completion of pre-cooling, the refrigerator inside temperature fluctuates within the temperature range from the cooling start temperature to the cooling end temperature.

Te1 is the timing when the air-conditioning switch 51*s* is turned off due to an operation error by the occupant. Therefore, between Te1 and Tc4, the air-conditioning operation is not started even if the cooling start temperature is exceeded, and the refrigerator inside temperature continues to rise. As a result of the continuous rise in the refrigerator inside temperature, the refrigerator inside temperature exceeds the upper limit and the temperature error notification is started. In response to this temperature error notification, the occupant performs an operation of switching the air-conditioning switch 51*s* on, and the air-conditioning operation is restarted at Tc4. As a result, the normal cooling mode of the air conditioner 10 is restarted.

From Tc4 to Te2, the air-conditioning operation in the normal cooling mode is executed. The temperature error notification is maintained from immediately after the air-conditioning operation is restarted at Tc4 until the refrigerator inside temperature falls below the upper limit. After that, the state in which the refrigerator inside temperature is kept within the appropriate temperature range is maintained, and the temperature error notification is stopped. Te2 is a timing at which the vehicle arrives at the final unloading site and the air-conditioning switch 51*s* is switched off. After Te2, the air conditioner 10 does not perform the air-conditioning operation. Therefore, the refrigerator inside temperature rises beyond the cooling start temperature, and rises to a temperature close to the outside air temperature. After Te2, even if the refrigerator inside temperature exceeds the upper limit value, the temperature error notification is not performed.

According to this embodiment, after the refrigerator inside temperature is within the appropriate temperature range due to the start of the air-conditioning operation, the notification control unit 75 performs the temperature error notification when the refrigerator inside temperature is outside the appropriate temperature range. In addition, the notification control unit 75 does not perform the temperature error notification from the start of the air-conditioning operation until the refrigerator inside temperature falls within the appropriate temperature range. In other words, before the completion of pre-cooling, the temperature error notification is not performed even if the refrigerator inside temperature exceeds the upper limit. Therefore, the occupant who has already recognized that the refrigerator inside temperature is higher than the upper limit value before the completion of pre-cooling is not notified again by the temperature error notification. Therefore, in the temperature error notification, it is possible to reduce the ratio of error notification due to the reason that the occupant has already recognized, and it is possible to increase the ratio of error notification due to the reason that the occupant does not recognize, such as an operation error or a failure of the air conditioner 10. In other words, in the temperature error notification, the ratio of error notification that does not require the occupant to deal with can be reduced, and the ratio of the error notification that the occupant needs to deal with can be increased. Therefore, it is possible to provide the air-conditioning system 1 capable of effectively notifying an error.

The notification control unit 75 notifies the temperature error if the refrigerator inside temperature is outside the appropriate temperature range, before the vehicle 2 arrives at the unloading place. The notification control unit 75 does not notify the temperature error after the vehicle 2 arrives at the unloading place. Therefore, after arriving at the unloading site, the temperature error notification is not performed since there is no problem even if the refrigerator inside temperature is higher than the upper limit due to the absence of the object to be cooled or the like. Therefore, in the temperature error notification, the ratio of error notification that does not require the occupant to deal with can be reduced, and the ratio of the error notification that the occupant needs to deal with can be relatively increased. Therefore, it is possible to provide the air-conditioning system 1 capable of effectively notifying an error.

When the vehicle 2 is moving and the refrigerator inside temperature is out of the appropriate temperature range, the notification control unit 75 performs the temperature error notification. The notification control unit 75 does not perform the temperature error notification while the vehicle 2 is stopped moving. Therefore, the occupant who has already recognized that the refrigerator inside temperature is higher than the upper limit value, such as during unloading, is not notified by the temperature error notification. Therefore, in the temperature error notification, the ratio of error notification that does not require the occupant to deal with can be reduced, and the ratio of the error notification that the occupant needs to deal with can be increased. Therefore, it is possible to provide the air-conditioning system 1 capable of effectively notifying an error.

The notification control unit 75 notifies the temperature error by using the occupant notification device 45. Further, in the notification step, the temperature error notification is performed using the occupant notification device 45. Therefore, it is possible to notify the occupant of the temperature error and directly urge the occupant to deal with the error. Therefore, when the temperature error that can be easily dealt with is notified, the error state can be quickly resolved by the occupant. Reasons that the occupant can easily deal with are assumed to be an operation error of the air-conditioning switch 51*s* and forgetting to close the cold storage door 3*d*.

If the refrigerator inside temperature does not fall within the appropriate temperature range within a predetermined time after the start of the air-conditioning operation, the notification control unit 75 performs the pre-cooling error notification. Further, in the notification step, if the refrigerator inside temperature does not fall within the appropriate temperature range within a predetermined time after the start of the air-conditioning operation, the pre-cooling error notification is performed. Therefore, the occupant can recognize the abnormality occurring during the pre-cooling. In particular, when the temperature error notification is not performed during the pre-cooling, the pre-cooling error notification is performed instead of the temperature error notification. Therefore, even during the pre-cooling without notifying the temperature error, the abnormality can be notified by the pre-cooling error notification.

After detecting that the cold storage door 3*d* is opened, the notification control unit 75 does not perform the temperature error notification until the refrigerator inside temperature is within the appropriate temperature range after detecting that the cold storage door 3*d* is closed. Further, in the notification step, after detecting that the cold storage door 3*d* is opened, the temperature error notification is not performed until the refrigerator inside temperature is within the appropriate temperature range after detecting that the cold storage door 3*d* is closed. Therefore, the temperature error is not notified during unloading since the cold storage door 3*d* needs to be opened. Further, if a temperature abnormality occurs after the pre-cooling is completed after the cold storage door 3*d* is closed, a temperature error notification is performed. Therefore, in the temperature error notification, the ratio of error notification that does not require the occupant to deal with can be reduced, and the ratio of the error notification that the occupant needs to deal with can be increased. Therefore, it is possible to provide the air-conditioning system 1 capable of effectively notifying an error. In particular, even after the cold storage door 3*d* is closed, it takes time for the refrigerator inside temperature to fall below the upper limit. In this way, by not performing the temperature error notification for temperature abnormalities that have been dealt with by the occupant, the effect of error notification for abnormalities of high importance can be relatively enhanced.

The method of controlling the air-conditioning by the air conditioner 10 includes a notification step in which a temperature error is notified after the pre-cooling is completed and when the refrigerator inside temperature is out of the appropriate temperature range, and no temperature error notification is performed before the pre-cooling is completed. Further, the air-conditioning control program for controlling the air-conditioning by the air conditioner 10 notifies a temperature error after the pre-cooling is completed and when the refrigerator inside temperature is out of the appropriate temperature range. The temperature error is not notified before the pre-cooling is completed. Therefore, it is not notified for the occupant of the recognized situation again by the temperature error notification. Therefore, in the temperature error notification, the ratio of error notification due to the reason recognized by the occupant can be reduced, and the ratio of error notification due to the reason not recognized by the occupant can be increased. Therefore, it is possible to provide an air-conditioning control method and an air-conditioning control program that can effectively notify an error.

The air-conditioning control method of the air conditioner 10 is to notify the temperature error before the vehicle 2 arrives at the unloading place and when the refrigerator inside temperature is out of the appropriate temperature range. After the vehicle 2 arrives at the unloading place, there is no step for performing the temperature error notification. Further, the air-conditioning control program for controlling the air-conditioning of the air conditioner 10 performs a temperature error notification before the vehicle 2 arrives at the unloading place and when the refrigerator inside temperature is outside the appropriate temperature range. After the vehicle 2 arrives at the unloading place, the temperature error is not notified. Therefore, the temperature error notification is not performed in a situation where there is no problem even if the refrigerator inside temperature is higher than the upper limit value. Therefore, in the temperature error notification, the ratio of the error notification that the occupant does not need to deal with can be reduced, and the ratio of the error notification that the occupant needs to deal with can be relatively increased. Therefore, it is possible to provide an air-conditioning control method and an air-conditioning control program that can effectively notify an error.

The air-conditioning control method of the air conditioner 10 is to notify a temperature error when the vehicle 2 is moving and the refrigerator inside temperature is out of the appropriate temperature range. While the vehicle 2 is stopped moving, the temperature error is not notified. Further, in the air-conditioning control program for controlling the air-conditioning of the air conditioner 10, when the vehicle 2 is moving and the refrigerator inside temperature is outside the appropriate temperature range, a temperature error notification is performed. While the vehicle 2 stops moving, the temperature error is not notified. Therefore, the occupant is not notified of the recognized situation by the temperature error notification. Therefore, in the temperature error notification, the ratio of the error notification that does not require the occupant's response can be reduced, and the ratio of the error notification that the occupant needs to handle can be increased. Therefore, it is possible to provide an air-conditioning control method and an air-conditioning control program that can effectively notify an error.

Second Embodiment

This embodiment is a modification based on the preceding embodiment. In this embodiment, if the refrigerator inside temperature is out of the appropriate temperature range at the timing when the temperature error notification is not performed, a preliminary error notification is performed.

Figure 8:
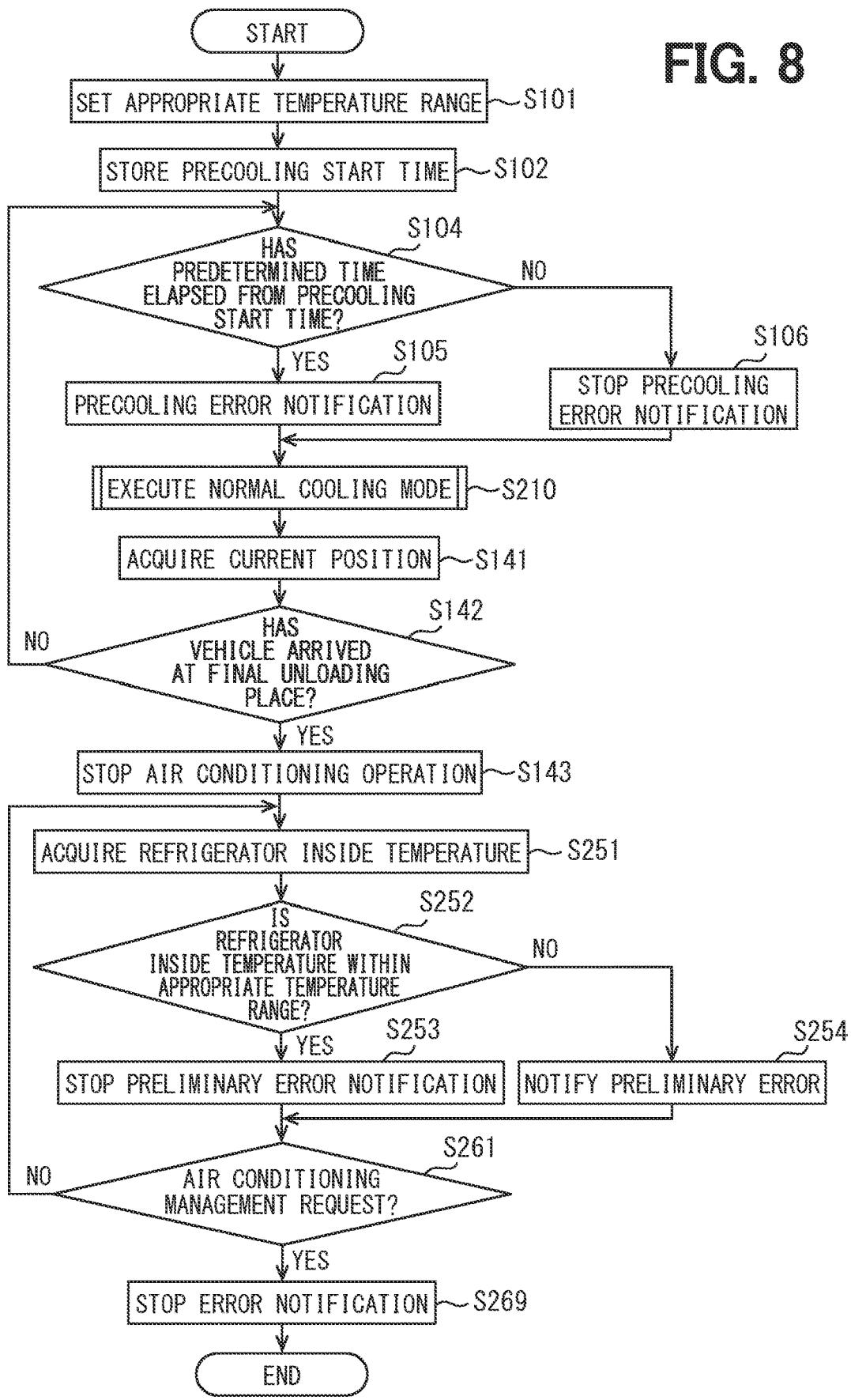
FIG. 8 is a flowchart relating to control of an air-conditioning system according to a second embodiment.

An example of air-conditioning control of the air conditioner 10 will be described below with reference to the flowchart. In FIG. 8, when the air-conditioning operation is started by operating the operation panel 51 by the occupant, the appropriate temperature range is set in step S101, and the process proceeds to step S102. In step S102, the pre-cooling start time is stored, and the process proceeds to step S104.

In step S104, it is determined whether a predetermined time has elapsed from the pre-cooling start time. If a predetermined time has elapsed from the pre-cooling start time, it is determined that the air conditioner 10 may not be functioning properly, and the process proceeds to step S105 to notify the pre-cooling error. Subsequently, the process proceeds to step S210. If a predetermined time has not elapsed from the pre-cooling start time or if the pre-cooling start time is not stored, it is determined that the air conditioner 10 is functioning properly, the process proceeds to step S106, and the pre-cooling error notification is stopped. Subsequently, the process proceeds to step S210.

Figure 9:
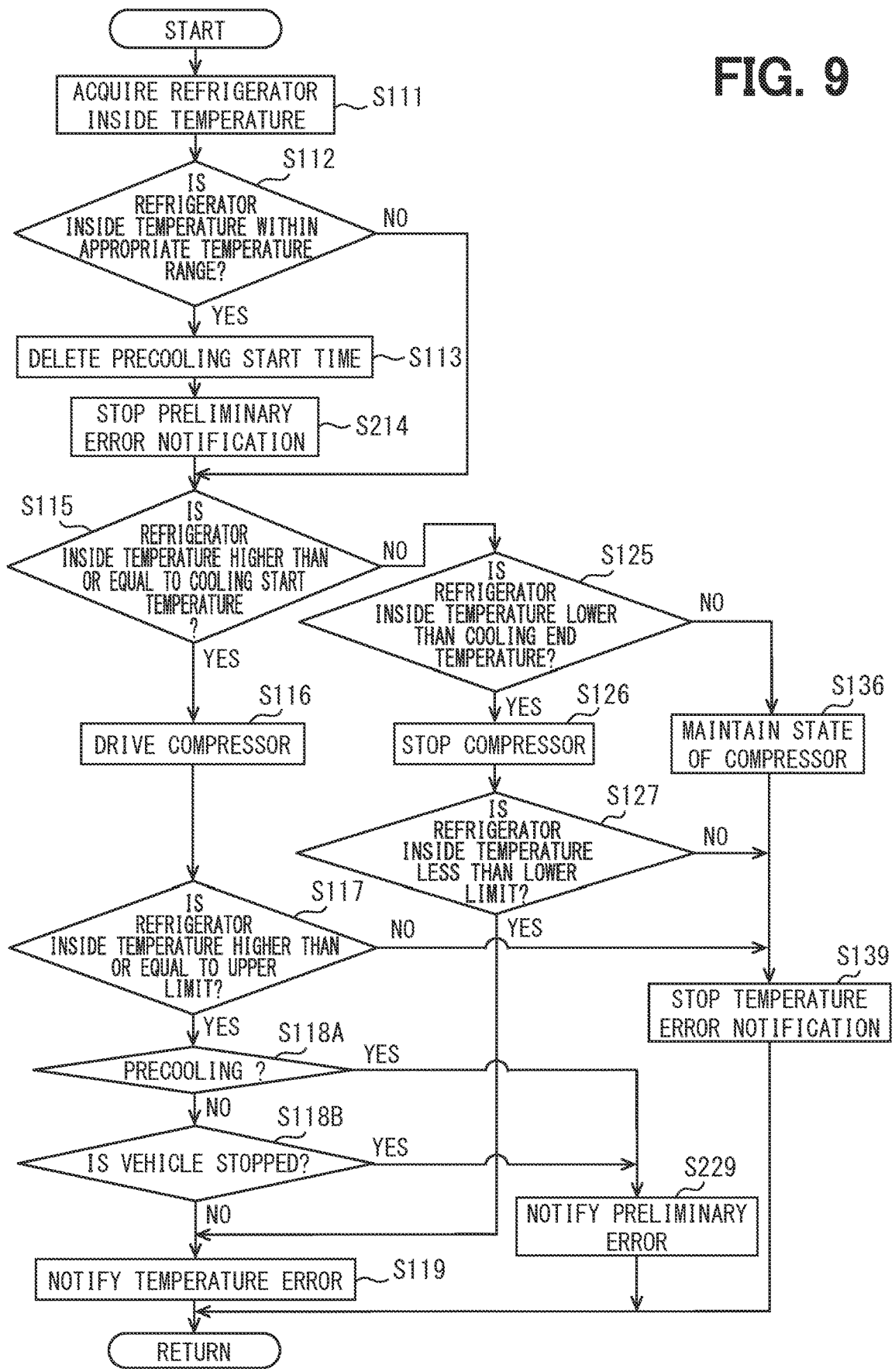
FIG. 9 is a flowchart relating to Step S210 in FIG. 8.

In step S210, the normal cooling mode is executed. After executing the normal cooling mode, the state of the normal cooling mode is maintained and the process proceeds to step S141. The details of the normal cooling mode will be described below. In FIG. 9, when the normal cooling mode is started, the refrigerator inside temperature is acquired in step S111, and the process proceeds to step S112. In step S112, it is determined whether the refrigerator inside temperature is within the appropriate temperature range. If the refrigerator inside temperature is within the appropriate temperature range, it is determined that the pre-cooling has been completed, the process proceeds to step S113, and the pre-cooling start time is deleted. Subsequently, the process proceeds to step S214. If the refrigerator inside temperature is out of the appropriate temperature range, it is determined that the pre-cooling is in progress, and the process proceeds to step S115.

In step S214, the preliminary error notification is stopped. The preliminary error notification is an error notification performed when the refrigerator inside temperature is out of the appropriate temperature range at the timing when the temperature error notification is not performed. Details of the preliminary error notification will be described later. If the preliminary error notification is being performed, the preliminary error notification is stopped. If the preliminary error notification is not performed, the state in which the preliminary error notification is not performed is maintained. After stopping the preliminary error notification, the process proceeds to step S115.

In step S115, it is determined whether the refrigerator inside temperature is equal to or higher than the cooling start temperature. If the refrigerator inside temperature is equal to or higher than the cooling start temperature, the process proceeds to step S116. If the refrigerator inside temperature is lower than the cooling start temperature, the process proceeds to step S125.

In step S116, the compressor 11, the condenser fan 12*f*, and the evaporator fan 15*f* are driven, and the process proceeds to step S117. In step S117, it is determined whether the refrigerator inside temperature is equal to or higher than the upper limit value. If the refrigerator inside temperature is equal to or higher than the upper limit, it is determined that either the temperature error notification or the preliminary error notification is necessary, and the process proceeds to step S118A. If the refrigerator inside temperature is less than the upper limit, the process proceeds to step S139.

In step S118A, it is determined whether the pre-cooling is in progress in a state where the pre-cooling start time is stored. If during the pre-cooling, it is not necessary to notify the temperature error, but it is determined that it is necessary to notify the preliminary error, and the process proceeds to step S229. If the pre-cooling is not in progress, the process proceeds to step S118B.

In step S118B, it is determined whether the vehicle 2 is stopped. When the vehicle 2 is stopped, it is determined that the temperature error notification is unnecessary, but the preliminary error notification is not necessary, and the process proceeds to step S229. On the other hand, if the vehicle 2 is not stopped, the process proceeds to step S119.

In step S125, it is determined whether the refrigerator inside temperature is lower than the cooling end temperature. If the refrigerator inside temperature is lower than the cooling end temperature, the process proceeds to step S126, and the compressor 11, the condenser fan 12*f*, and the evaporator fan 15*f* are stopped. Subsequently, the process proceeds to step S127. On the other hand, when the refrigerator inside temperature is lower than the cooling end temperature, the process proceeds to step S136, and the compressor 11, the condenser fan 12*f*, and the evaporator fan 15*f* are maintained in the immediately preceding states. Subsequently, the process proceeds to step S139.

In step S119, the temperature error notification is performed, the state of the compressor 11 and the temperature error notification state are maintained, and the change in control in the normal cooling mode is terminated.

In step S229, the preliminary error notification is performed, which is an error notification indicating that the refrigerator inside temperature is not within the appropriate temperature range at the timing when the temperature error notification is not performed. The preliminary error notification includes notification that the refrigerator inside temperature is higher than the upper limit. The preliminary error notification is an example of error notification. Step S229 provides an example of a notification step.

As an example of preliminary error notification, a temperature abnormality recognized by the occupant is assumed. More specifically, the preliminary error notification is for a temperature abnormality during the pre-cooling before storing the object to be cooled at the starting point of cold transport. Alternatively, the preliminary error notification is for a temperature abnormality while the vehicle 2 is stopped and the unloading work is being performed.

In the preliminary error notification, a warning message indicating that the current temperature inside the refrigerator is not within the appropriate temperature range is displayed on the display screen of the occupant notification device 45. The preliminary error notification is an error notification that is suppressed as compared with the temperature error notification. More specifically, in the preliminary error notification, the size of the warning message displayed on the display screen is set smaller than that in the case of the temperature error notification. As a result, the occupant is notified that an error related to the temperature of the cold storage 3 has occurred not so much positively, as compared with the temperature error notification. When the preliminary error notification is an unexpected error notification, the occupant confirms whether the cold storage door 3*d* is closed and whether the air conditioner 10 is turned on. By doing this, it is possible to deal with the temperature abnormalities. After the preliminary error notification is performed, the state of the compressor 11 and the state in which the preliminary error notification is performed are maintained, and the change in control in the normal cooling mode is terminated.

The method of suppressing the preliminary error notification as compared with the temperature error notification is not limited to reducing the size of the display. For example, in the preliminary error notification, the loudness of the warning sound emitted from the sounding device of the occupant notification device 45 may be made smaller than in the case of the temperature error notification. Alternatively, in the preliminary error notification, the sound may not be produced from the sounding device of the occupant notification device 45. For example, the display screen may be blinked in the temperature error notification, and the display screen may not be blinked in the preliminary error notification. For example, a color coding may be performed in a manner that the red lamp may be turned on in the temperature error notification, and the yellow lamp may be turned on in the preliminary error notification.

In step S139, the error notification is stopped, the state of the compressor 11 and the state in which the error notification is stopped are maintained, and the change in control in the normal cooling mode is terminated.

In step S141 of FIG. 8, the current position of the vehicle 2 is acquired, and the process proceeds to step S142. In step S142, it is determined whether the vehicle 2 has arrived at the final unloading place. If the vehicle 2 has arrived at the final unloading site, the process proceeds to step S143. On the other hand, if the vehicle 2 has not arrived at the final unloading place, the process returns to step S104, and the air-conditioning operation is continued until the vehicle 2 arrives at the final unloading place.

In step S143, the air-conditioning operation by the air conditioner 10 is stopped, and the process proceeds to step S251.

In step S251, the refrigerator inside temperature is acquired. Since the air-conditioning operation has been stopped, the refrigerator inside temperature, which is gradually approaching the outside air temperature, will be measured. After acquiring the refrigerator inside temperature, the process proceeds to step S252.

In step S252, it is determined whether the refrigerator inside temperature is within the appropriate temperature range. If the refrigerator inside temperature is within the appropriate temperature range, the process proceeds to step S253. If the refrigerator inside temperature is out of the appropriate temperature range, the process proceeds to step S254.

In step S253, the preliminary error notification is stopped, if the preliminary error notification is being performed. When the preliminary error notification is not performed, the state in which the preliminary error notification is not performed is maintained. After stopping the preliminary error notification, the process proceeds to step S261.

In step S254, the preliminary error notification is performed. The preliminary error notification notifies the occupant that the refrigerator inside temperature is not within the appropriate temperature range even after arriving at the final unloading site and stopping the air-conditioning operation. After performing the preliminary error notification, the process proceeds to step S261. Step S254 provides an example of a notification step.

In step S261, it is determined whether there is an air-conditioning management request. The air-conditioning management request is a request for checking and managing whether the refrigerator inside temperature is within an appropriate temperature range, regardless of whether the air conditioner 10 is turned on or off. For example, when it is desired to constantly check and record the refrigerator inside temperature regardless of the presence or absence of an object to be cooled, there is always a request for air-conditioning management. If there is an air-conditioning management request, the process returns to step S251 to acquire the latest refrigerator inside temperature. If there is no air-conditioning management request, the process proceeds to step S269.

In step S269, the error notification is stopped. If the temperature error notification is being performed, the temperature error notification is stopped. On the other hand, when the temperature error notification is not performed, the state in which the temperature error notification is not performed is maintained. After stopping the error notification, a series of air-conditioning control using the air conditioner 10 is terminated.

Figure 10:
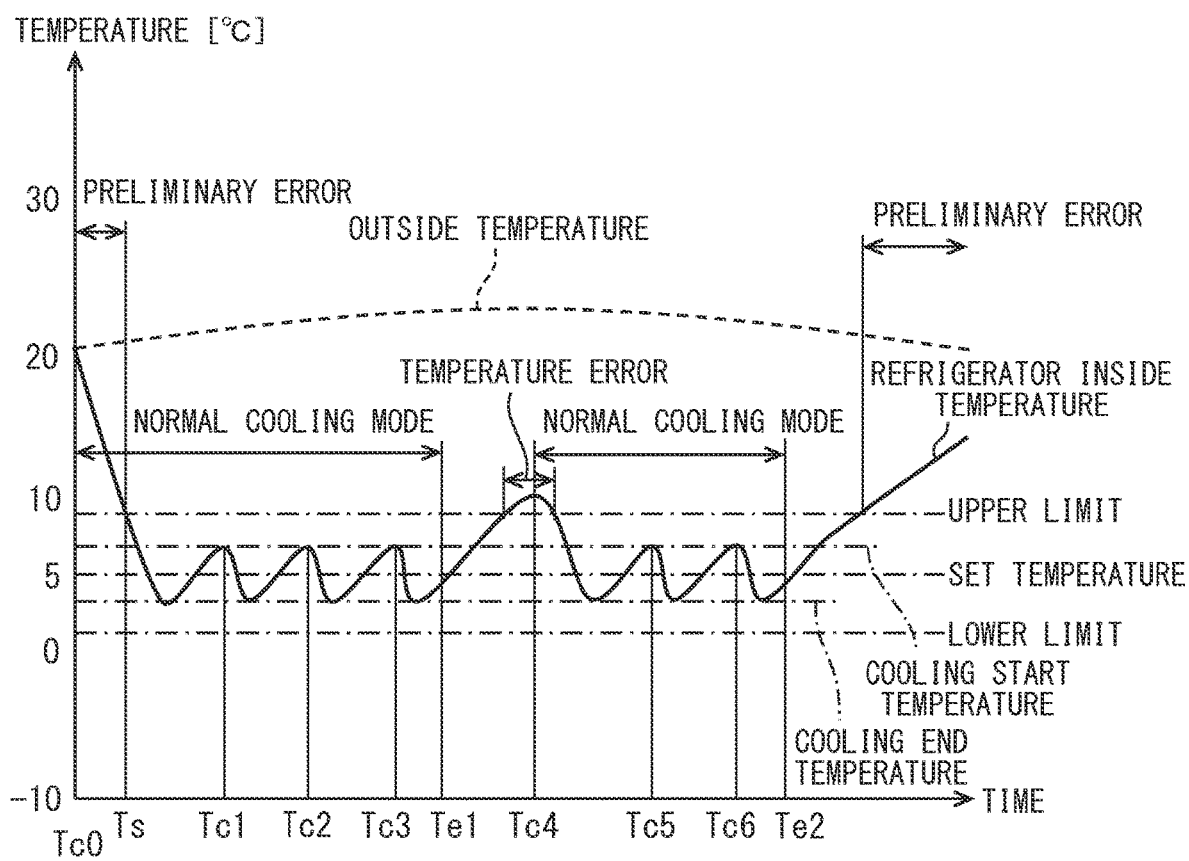
FIG. 10 is a graph showing changes in temperature inside the cold storage when an error notification is performed in the second embodiment.

An example of the air-conditioning operation of the air conditioner 10 including the temperature error notification will be described below using FIG. 10, in which the horizontal axis represents time and the vertical axis represents temperature. The graph is shown by taking the case where the set temperature of the air conditioner 10 is 5° C. and the outside air temperature is about 20° C. as an example.

Tc0 is a timing at which the low temperature transportation is started, or a timing at which the cold storage door 3d opened for unloading is closed while executing the air-conditioning operation. Ts is a timing when the refrigerator inside temperature first falls within the appropriate temperature range from the start of the normal cooling mode. The period from Tc0 to Ts is in the pre-cooling state. Therefore, the temperature error notification is not performed, and the preliminary error notification is performed. From Ts to Te1, the refrigerator inside temperature fluctuates within the temperature range from the cooling start temperature to the cooling end temperature.

Te1 is a timing when the air-conditioning switch 51s is turned off due to an operation error of the occupant. Therefore, between Te1 and Tc4, the air-conditioning operation is not started even if the cooling start temperature is exceeded, and the refrigerator inside temperature continues to rise. As a result of the continuous rise in the refrigerator inside temperature, the refrigerator inside temperature exceeds the upper limit and the temperature error notification is started. In response to this temperature error notification, the occupant operates to switch the air-conditioning switch 51s on, and the air-conditioning operation is restarted at Tc4.

From Tc4 to Te2, the normal cooling mode is executed. Immediately after restarting the air-conditioning operation at Tc4, the temperature error notification is maintained until the refrigerator inside temperature falls below the upper limit. After that, the state in which the refrigerator inside temperature is kept within the appropriate temperature range is maintained, and the temperature error notification is stopped. Te2 is the timing when the air-conditioning switch 51s is switched off after arriving at the final unloading site.

After Te2, since the air conditioner 10 does not perform the air-conditioning operation, the refrigerator inside temperature rises beyond the cooling start temperature and rises to a temperature close to the outside air temperature. After Te2, even if the refrigerator inside temperature exceeds the upper limit value, the temperature error notification is not performed, but the preliminary error notification is performed. The preliminary error notification will be maintained until the refrigerator inside temperature falls within the appropriate temperature range or the air-conditioning control request disappears. However, the preliminary error notification may be forcibly stopped by operating the operation panel 51.

According to this embodiment, the notification control unit 75 performs the preliminary error notification when the refrigerator inside temperature is outside the appropriate temperature range at the timing when the temperature error notification is not performed. Further, the notification step performs the preliminary error notification at a timing at which the temperature error notification is not performed, and when the refrigerator inside temperature is outside the appropriate temperature range. Therefore, it is possible to properly notify the occupant of the error by using the two error notifications, e.g., the temperature error notification and the preliminary error notification. It is possible to use different error notifications according to the importance of the abnormality, such as a temperature error notification for an abnormality of high importance and a preliminary error notification for an abnormality of low importance. Therefore, the occupant can easily recognize what kind of abnormality is occurring. Therefore, it is possible to effectively motivate the occupant to deal with the abnormality.

When performing the preliminary error notification, the notification control unit 75 performs suppressed error notification as compared with the temperature error notification. Further, in the notification step, when the preliminary error notification is performed, the error notification is suppressed as compared with the temperature error notification. Therefore, in the error notification, the temperature error notification is relatively stronger to the occupant than the preliminary error notification. Therefore, it is easy for the occupant who received the error notification to determine whether the temperature abnormality should be dealt with immediately or not.

Third Embodiment

This embodiment is a modification based on the preceding embodiment. In this embodiment, the air-conditioning system 1 includes an air-conditioning communication device 360 and a server 380. The air-conditioning system 1 communicates with the external server 380 by using the air-conditioning communication device 360 mounted on the vehicle 2 in order to notify the error in air-conditioning control.

Figure 11:
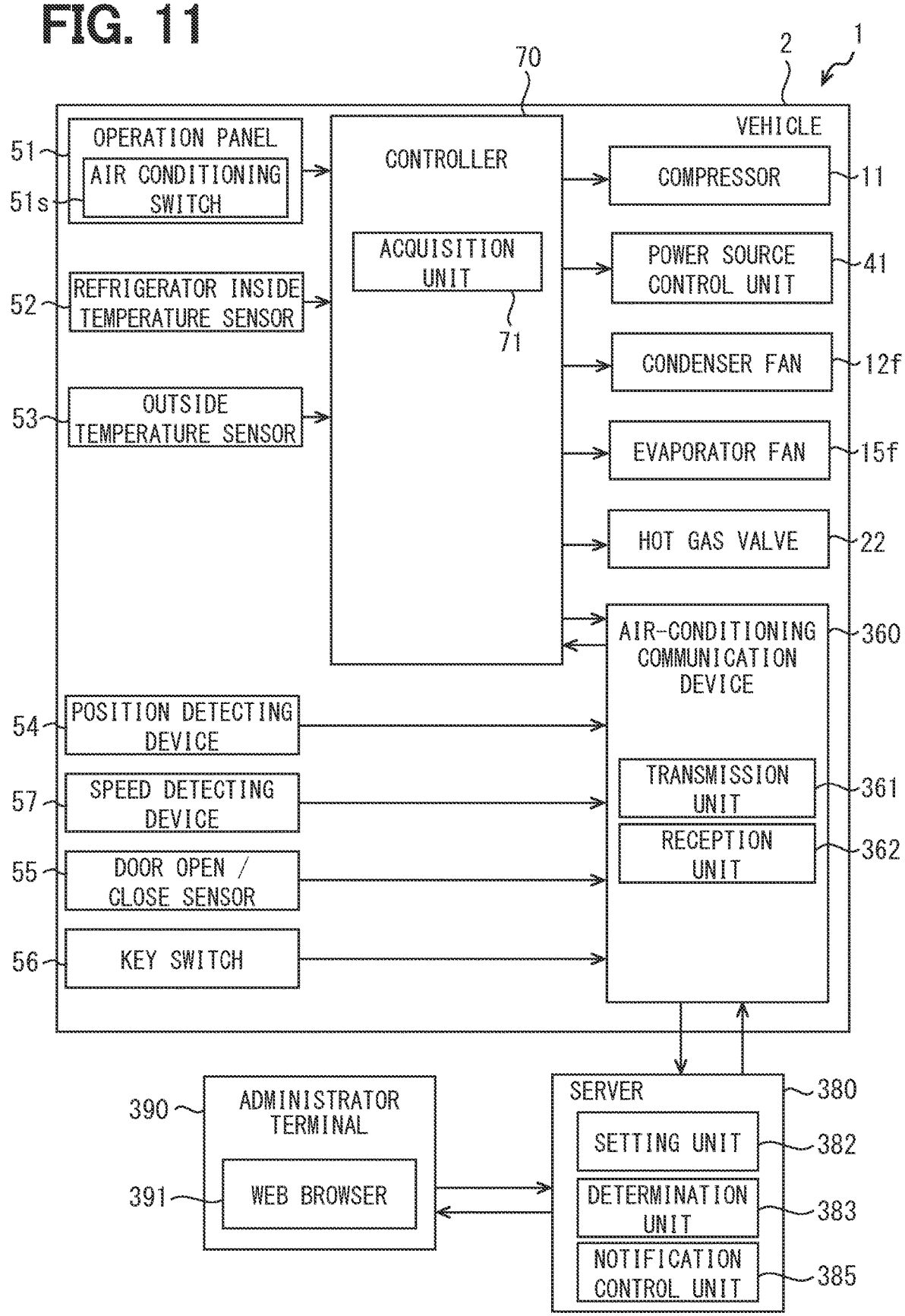
FIG. 11 is a block diagram relating to control of an air-conditioning system according to a third embodiment.

In FIG. 11, the vehicle 2 is provided with the operation panel 51 having the air-conditioning switch 51s, the refrigerator inside temperature sensor 52, and the outside temperature sensor 53. The vehicle 2 is provided with the position detecting device 54, the speed detecting device 57, the door open/close sensor 55, and the key switch 56. The vehicle 2 is provided with the compressor 11, the power supply control unit 41, the condenser fan 12f, the evaporator fan 15f, and the hot gas valve 22.

The vehicle 2 is provided with the controller 70 and the air-conditioning communication device 360. The air-conditioning communication device 360 communicates with the server 380 provided outside the vehicle 2 about information regarding the air-conditioning operation of the air conditioner 10. The air-conditioning communication device 360 includes a transmission unit 361 and a reception unit 362. The transmission unit 361 sends information on the air-conditioning operation acquired from the controller 70 and information on the states of the position detecting device 54, the speed detecting device 57, the door open/close sensor 55, and the key switch 56 to the server 380 at a regular interval. The transmission interval of the transmission unit 361 is, for example, 30 seconds. The reception unit 362 receives information about the air-conditioning operation from the server 380 at a regular interval. More specifically, the reception unit 362 confirms the presence/absence of a signal in the server 380. If there is a signal, the reception unit 362 transmits the received signal to the controller 70. The signal is, for example, a signal for turning off the air conditioner 10. The reception interval of the reception unit 362 is, for example, 30 seconds.

The air-conditioning communication device 360 repeatedly communicates with the server 380 at predetermined time interval in order to acquire a signal related to the air-conditioning operation regardless of the presence or absence of a signal to be received. The controller 70 is connected to the air-conditioning communication device 360. The controller 70 controls the air-conditioning communication device 360 to communicate with the outside. The air-conditioning communication device 360 is an on-board unit mounted on the vehicle 2.

The air-conditioning system 1 includes the server 380 provided outside the vehicle 2 and an administrator terminal 390. The server 380 constitutes a part of the controller 70.

The server 380 is connected to a public communication network. The server 380 acquires information transmitted from the air-conditioning communication device 360 via the public communication network. Further, the server 380 transmits information to the air-conditioning communication device 360 via the public communication network.

The server 380 has a microcomputer including, for example, a processor, a memory, an I/O, and a bus connecting them. The server 380 executes various processes by executing the control program stored in the memory. The memory referred to here is a non-transitory tangible storage medium for storing programs and data that can be read by a computer in a non-transitory manner. The non-transitory tangible storage medium may be provided by a semiconductor memory or a magnetic disk.

The server 380 may be composed of one server device or may be composed of plural server devices. The server 380 may be a server device arranged on the cloud.

The server 380 includes a setting unit 382, a determination unit 383, and a notification control unit 385. The setting unit 382 receives an instruction from the WEB browser 391 in the administrator terminal 390 and sets various conditions related to error notification. The determination unit 383 determines whether to perform the error notification. In other words, the determination unit 383 determines whether the condition set by the setting unit 382 is satisfied based on the information of the vehicle 2 acquired by the acquisition unit 71. The notification control unit 385 controls the error notification based on the determination result determined by the determination unit 383. The notification control unit 385 outputs an error notification signal to the administrator in response to an inquiry from the administrator terminal 390. The administrator terminal 390 provides an example of a notification device.

The administrator terminal 390 is connected to the server 380. The administrator terminal 390 displays information about the air-conditioning operation acquired from the server 380. The administrator terminal 390 displays information regarding the error notification determined by the server 380. The administrator terminal 390 includes the WEB browser 391. The WEB browser 391 functions as a display screen that displays information on the state of air-conditioning operation and error notification to the administrator.

The administrator terminal 390 updates conditions of the error notification in the setting unit 382 of the server 380. For example, the administrator terminal 390 changes the appropriate temperature range, and/or changes the conditions for determining whether the refrigerator is being pre-cooled or stopped. If the determination of whether or not the vehicle is stopped is based on the vehicle speed, the determination can be changed to be based on whether or not the shift lever is parked instead of the vehicle speed. The WEB browser 391 functions as an operation screen on which the administrator can update the conditions related to the error notification.

Figure 12:
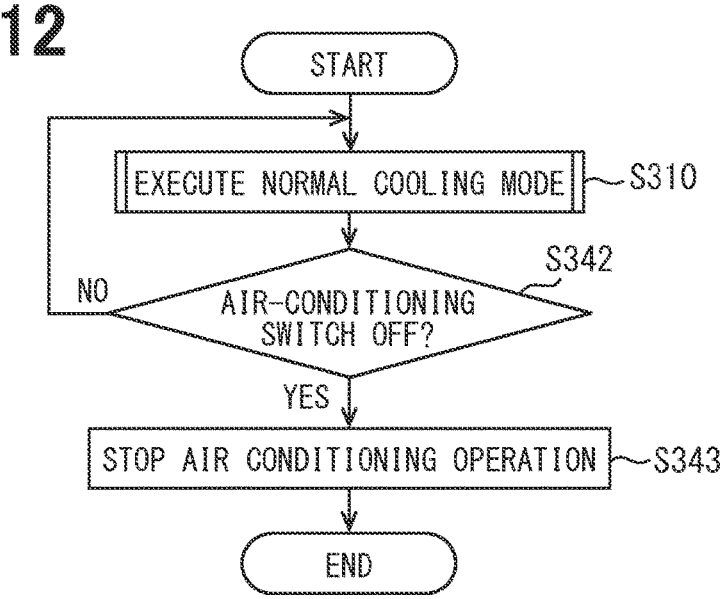
FIG. 12 is a flowchart relating to control of an air conditioner according to the third embodiment.
Figure 13:
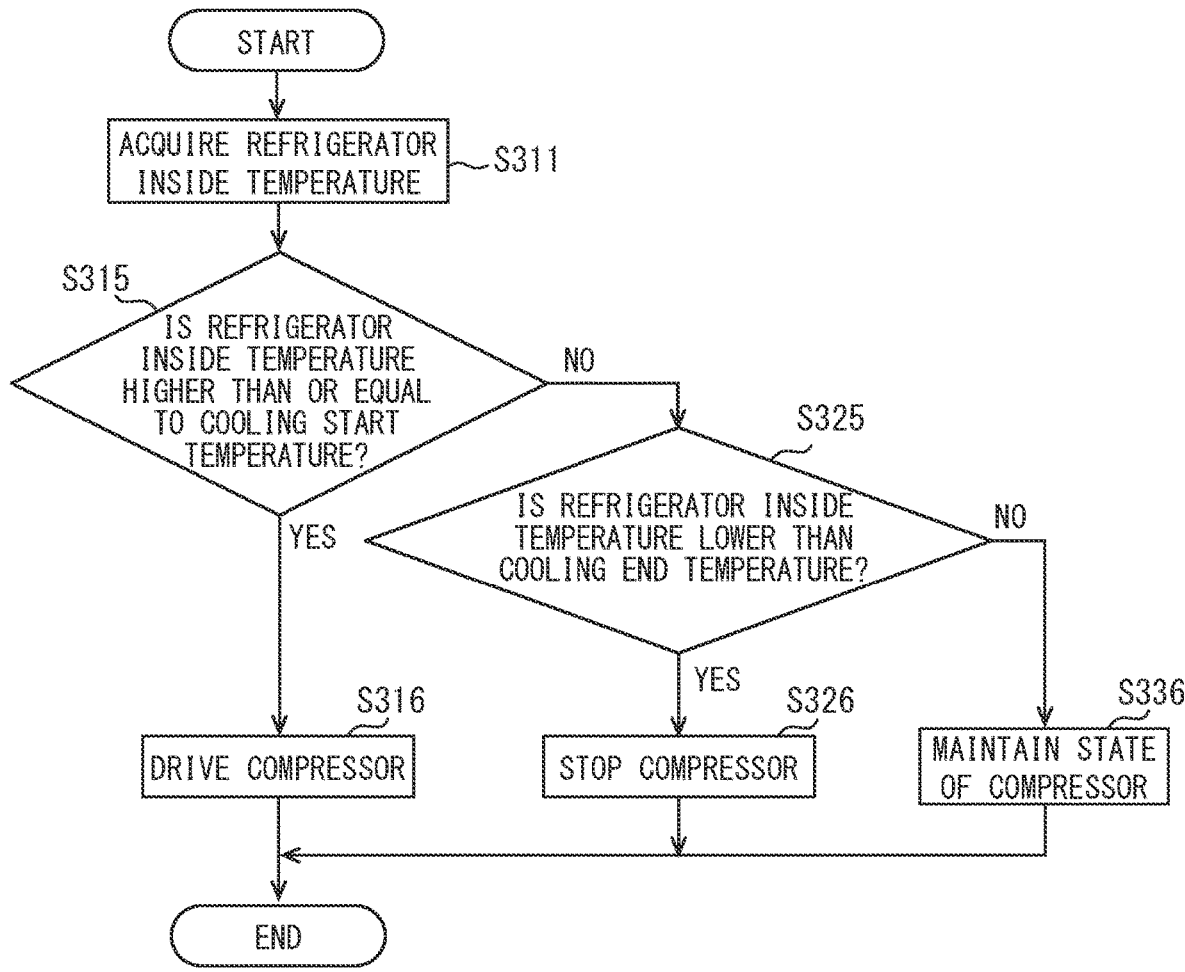
FIG. 13 is a flowchart relating to Step S310 in FIG. 12.

The control of the air conditioner 10 mounted on the vehicle 2 will be described below. In FIG. 12, when the air-conditioning operation is started, the normal cooling mode is executed in step S310. After executing the normal cooling mode, the state of the normal cooling mode is maintained, and the process proceeds to step S342. The details of the normal cooling mode will be described below. In FIG. 13, when the normal cooling mode is started, the refrigerator inside temperature is acquired in step S311 and the process proceeds to step S315.

In step S315, it is determined whether the refrigerator inside temperature is equal to or higher than the cooling start temperature. When the refrigerator inside temperature is equal to or higher than the cooling start temperature, the process proceeds to step S316. If the refrigerator inside temperature is lower than the cooling start temperature, the process proceeds to step S325.

In step S316, the compressor 11, the condenser fan 12*f*, and the evaporator fan 15*f* are driven to end the change in control of the normal cooling mode.

In step S325, it is determined whether the refrigerator inside temperature is lower than the cooling end temperature. When the refrigerator inside temperature is lower than the cooling end temperature, it is determined that it is not necessary to cool the refrigerator, and the process proceeds to step S326. When the refrigerator inside temperature is lower than the cooling end temperature, it is determined that the current state should be maintained, and the process proceeds to step S336.

In step S326, the compressor 11, the condenser fan 12*f*, and the evaporator fan 15*f* are stopped to end the change in control of the normal cooling mode.

In step S336, the compressor 11, the condenser fan 12*f*, and the evaporator fan 15*f* are maintained in the immediately preceding states, and the change in control in the normal cooling mode is completed.

In step S342 of FIG. 12, it is determined whether the air-conditioning switch 51*s* is on or off. If the air-conditioning switch 51*s* is off, the process proceeds to step S343. If the air-conditioning switch 51*s* is on, the normal cooling mode is maintained until the process returns to step S310 and the air-conditioning switch 51*s* is turned off. Here, the air-conditioning switch 51*s* can be switched on and off not only by the operation of the occupant but also by the signal output from the server 380.

In step S343, the air-conditioning operation is stopped. More specifically, the drive of the compressor 11, the condenser fan 12*f*, and the evaporator fan 15*f* is stopped. After stopping the air-conditioning operation, the air-conditioning control for the air conditioner 10 is terminated.

Figure 14:
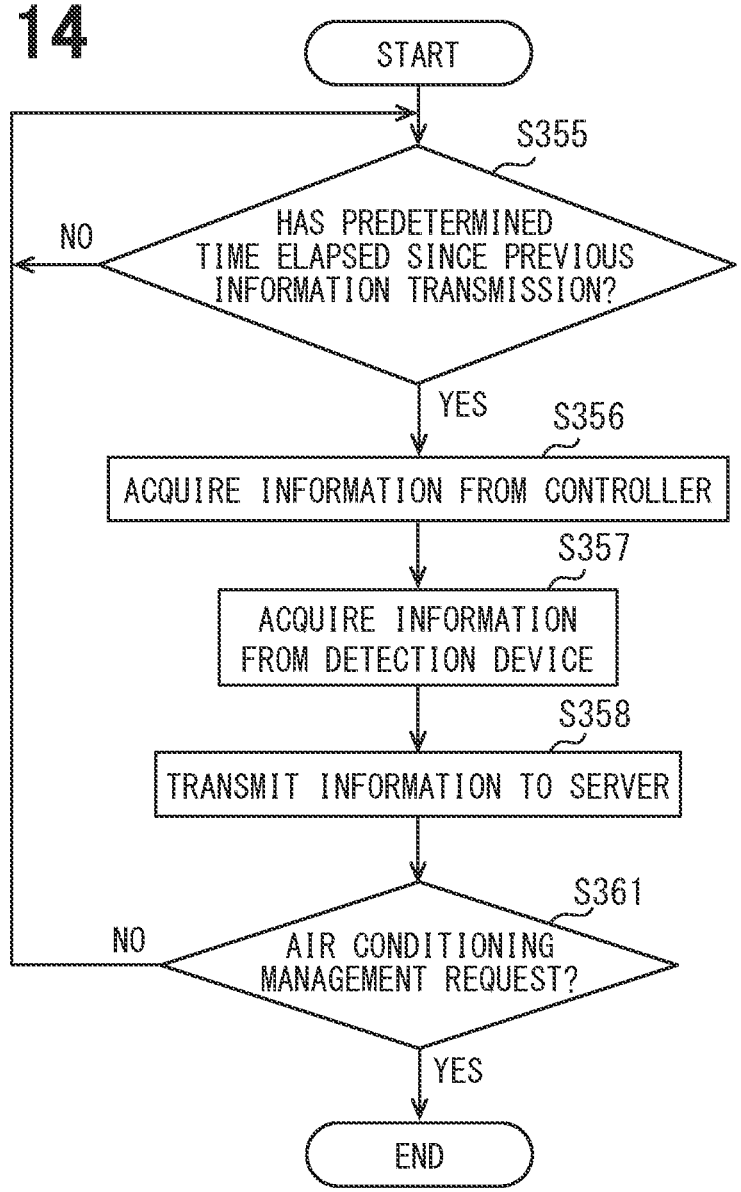
FIG. 14 is a flowchart relating to control of an air-conditioning communication device according to the third embodiment.

The control of the air-conditioning communication device 360 mounted on the vehicle 2 will be described below. In FIG. 14, when the air-conditioning operation is started, it is determined in step S355 whether a predetermined time has elapsed since the previous information transmission. Here, the predetermined time is, for example, 30 seconds. Further, the air-conditioning communication device 360 records the time of communication each time communication is performed. When a predetermined time has elapsed since the previous information transmission, it is determined that new information should be transmitted, and the process proceeds to step S356. When the predetermined time has not elapsed since the previous information transmission, it is determined that it is not necessary to newly transmit the information, and the process waits without transmitting the information until the predetermined time elapses.

In step S356, information is acquired from the controller 70. The information acquired from the controller 70 includes, for example, information such as the refrigerator inside temperature, the outside air temperature, the set temperature, and the operating state of the air conditioner 10. Here, the operating state of the air conditioner 10 includes, for example, a state such as a normal operation and a defrosting operation. However, the information acquired from the controller 70 is not limited to the above-mentioned information. After acquiring the information from the controller 70, the process proceeds to step S357.

In step S357, information is acquired from the position detecting device 54 and the speed detecting device 57. The information acquired from the position detecting device 54 includes information indicating the current position such as latitude, longitude, and altitude. The information acquired from the speed detecting device 57 includes vehicle speed information. However, the information acquired from the controller 70 is not limited to the above-mentioned information. For example, information on the current range of the vehicle 2 may be acquired from the shift lever. After acquiring the information from the detection device, the process proceeds to step S358.

In step S358, information is transmitted to the server 380. The information transmitted to the server 380 includes information acquired from the controller 70 such as the refrigerator inside temperature and information acquired from the detection device such as the current position. In addition, the information is transmitted to the server 380, and the signal stored in the server 380 to be transmitted to the vehicle 2 is acquired. When the air-conditioning communication device 360 acquires a signal from the server 380, the acquired signal is sent to the controller 70. After transmitting the information to the server 380, the process proceeds to step S361.

In step S361, it is determined whether there is an air-conditioning management request. If there is an air-conditioning management request, the process returns to step S355 and repeats a series of communications. If there is no air-conditioning management request, the communication using the air-conditioning communication device 360 is terminated. However, information such as the refrigerator inside temperature of the vehicle 2 is indispensable for the control related to the error notification. Therefore, basically, the state where there is an air-conditioning management request is maintained.

As described above, the control related to error notification is not performed in the vehicle 2, but air-conditioning control other than the error notification is performed. Therefore, it is not necessary to perform complicated arithmetic processing for error notification in the devices on the vehicle 2 such as the air conditioner 10 and the air-conditioning communication device 360.

Figure 15:
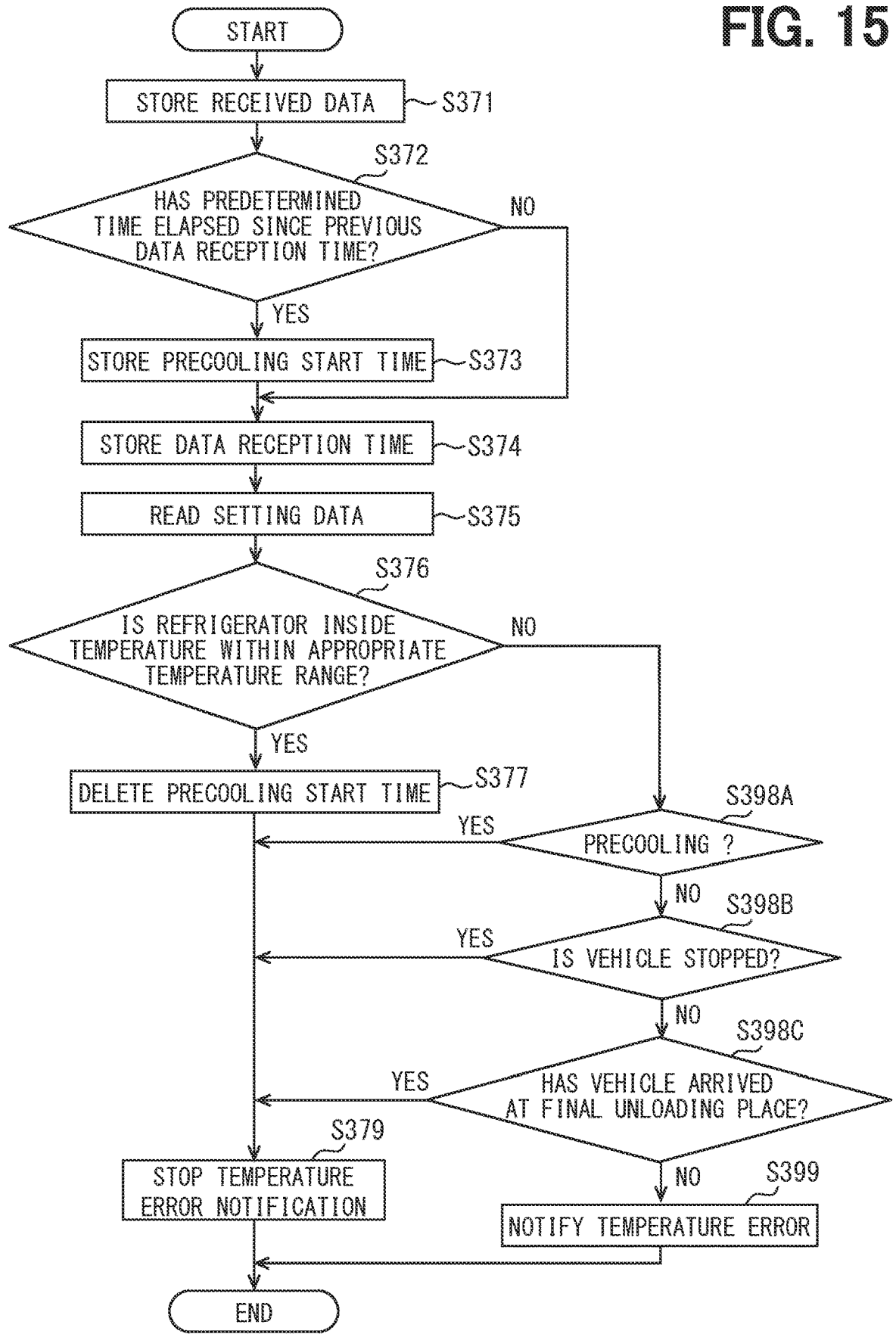
FIG. 15 is a flowchart relating to a control of a server in the third embodiment.

The control related to the error notification by the server 380 provided outside the vehicle 2 will be described below. In FIG. 15, when the air-conditioning operation is performed as the air-conditioning system 1, the server 380 is able to receive a signal which is information transmitted from the vehicle 2. In this state, the server 380 receives the signal transmitted from the vehicle 2, and the control flow regarding the error notification is started on the server 380. For example, when the air-conditioning communication device 360 transmits data every 30 seconds, the server 380 receives the data every 30 seconds. In this case, on the server 380, the control flow described later is repeatedly executed every 30 seconds based on the latest data.

In FIG. 15, when the server 380 receives the signal transmitted from the air-conditioning communication device 360 and starts the control related to the error notification, the received data is stored in step S371. The received data includes information such as the current position of the vehicle 2 acquired from the controller 70 by the air-conditioning communication device 360. The received data includes information such as the speed of the vehicle 2 acquired from the detection device. After storing the received data, the process proceeds to step S372. Step S371 provides an example of a temperature acquiring step.

In step S372, it is determined whether a predetermined time has elapsed since the previous data reception time. Here, the predetermined time is, for example, 10 minutes. The predetermined time may be a time sufficiently longer than the transmission interval of the air-conditioning communication device 360, and is not limited to the above-mentioned value. If a predetermined time has elapsed from the previous data reception time, the process proceeds to step S373, assuming that it is the timing when the air-conditioning operation for low temperature transportation is started. If a predetermined time has not elapsed since the previous data reception time, it is considered that the air-conditioning operation is continuously performed, and the process proceeds to step S374.

The reason why it can be regarded as the timing when the air-conditioning operation for low temperature transportation is started when a predetermined time has passed from the previous data reception time will be described below. During the air-conditioning operation, data is transmitted from the air-conditioning communication device 360 at short transmission intervals of, for example, every 30 seconds. Therefore, the server 380 receives data at a short reception interval of, for example, every 30 seconds. If there is no data reception for a predetermined time set sufficiently longer than the transmission interval of the air-conditioning communication device 360, it is considered that the air-conditioning operation has not been performed for a while. That is, the timing at which the data is received for the first time in a long time can be regarded as the timing at which the air-conditioning operation for low temperature transportation is started.

In step S373, the current time is acquired from the built-in clock of the server 380, and the acquired current time is regarded as the pre-cooling start time and stored. By storing the pre-cooling start time, the pre-cooling state is set. After storing the pre-cooling start time, the process proceeds to step S374.

In step S374, the data reception time is stored. After storing the data reception time, the process proceeds to step S375.

In step S375, the setting data is read. The setting data is used for determining whether or not to perform the error notification. The setting data is set by the operation of the administrator terminal 390 by the administrator. The setting data includes information on the appropriate temperature range. The information on the appropriate temperature range is, for example, information on the upper limit value and the lower limit value of the appropriate temperature range. The setting data includes information for determining whether or not the pre-cooling is in progress. The information for determining whether the pre-cooling is in progress is, for example, information on the elapsed time from the previous data reception time. The setting data includes information for determining whether the vehicle is stopped. The information for determining whether the vehicle is stopped is information indicating conditions. For example, when the speed is 5 km/h or less, it is considered that the vehicle is stopped. The setting data includes information on the final unloading location. After reading the setting data, the process proceeds to step S376. Step S375 provides an example of a temperature setting step.

In step S376, it is determined whether the refrigerator inside temperature is within the appropriate temperature range. As the refrigerator inside temperature, the latest temperature inside the refrigerator is used for determination from the stored received data. If the refrigerator inside temperature is within the appropriate temperature range, it is determined that no temperature abnormality to be notified has occurred, and the process proceeds to step S377. When the refrigerator inside temperature is out of the appropriate temperature range, it is determined that further determination is necessary as to whether or not the temperature abnormality should be notified, and the process proceeds to step S398A. Step S376 provides an example of a temperature determining step.

In step S377, the pre-cooling start time is deleted. As a result, the pre-cooling start time is not stored, that is, the pre-cooling is not in progress. If the pre-cooling error is notified, the pre-cooling error notification is stopped. After deleting the pre-cooling start time, the process proceeds to step S379.

In step S398A, it is determined whether the pre-cooling is in progress by determining whether or not the pre-cooling start time is stored. If it is during the pre-cooling, it is determined that it is not necessary to notify the error, and the process proceeds to step S379. If the pre-cooling is not in process, the process proceeds to step S398B. Step S398A provides an example of a pre-cooling determining step.

In step S398B, it is determined whether the vehicle 2 is stopped. In other words, it is determined whether the vehicle 2 is moving based on the speed information of the vehicle 2 included in the received data. If the vehicle 2 is stopped, it is determined that it is not necessary to notify the error, and the process proceeds to step S379. On the other hand, if the vehicle 2 is not stopped, the process proceeds to step S398C. Step S398B provides an example of a moving determining step.

In step S398C, it is determined whether the vehicle 2 has arrived at the final unloading place from the information on the current position of the vehicle 2 included in the received data. When the vehicle 2 has arrived at the final unloading place, it is determined that it is not necessary to notify the error, and the process proceeds to step S379. On the other hand, if the vehicle 2 has not arrived at the final unloading place, the process proceeds to step S399. Step S398C provides an example of a position determining step.

In step S399, the temperature error notification is performed. In the temperature error notification, a warning message indicating that the current temperature inside the refrigerator is not within the appropriate temperature range is displayed on the WEB browser 391 which is the display screen of the administrator terminal 390. Further, a warning sound is emitted from the sounding device of the administrator terminal 390. As a result, the administrator is notified that an error regarding the temperature of the cold storage 3 has occurred. Upon receiving the temperature error notification, the administrator can deal with the temperature abnormalities by giving instructions to the occupant of the vehicle 2 to confirm whether the cold storage door 3*d* is closed and whether the air conditioner 10 is turned on. After the temperature error notification is performed, the state in which the temperature error notification is performed is maintained and the control of the server 380 is terminated. Step S399 provides an example of a notification step.

In step S379, the temperature error notification is stopped. After stopping the temperature error notification, the state in which the temperature error notification is stopped is maintained and the control of the server 380 is terminated. However, each time a signal transmitted from the vehicle 2 is received, a series of control flows are repeated. Therefore, the error notification displayed on the WEB browser 391 is periodically updated to the latest state. After stopping the temperature error notification, the state in which the temperature error notification is stopped is maintained and the control of the server 380 is terminated. Step S379 provides an example of a notification step.

The error notification may be suppressed or forcibly stopped by the operation of the administrator terminal 390 by the administrator. According to this, after the administrator has instructed the occupant to take measures to resolve the abnormality, the error notification is restricted from being maintained until the refrigerator inside temperature actually falls within the appropriate temperature range.

According to this embodiment, the notification control unit 385 performs the temperature error notification using the administrator terminal 390. Further, in the notification step, the temperature error notification is performed using the administrator terminal 390. Therefore, it is possible to notify the administrator of the temperature error. Therefore, if the manager who is in a position other than the occupant manages the refrigerator inside temperature, the burden on the occupant in low temperature transportation can be reduced. As a result, the occupant can concentrate on driving and improve the safety of vehicle. Further, when a low temperature transportation is performed using plural vehicles 2, the manager can easily check whether the refrigerator inside temperature is appropriate.

The setting data related to the error notification can be updated using the administrator terminal 390. Therefore, it is not necessary to operate the operation panel 51 or the like for each vehicle 2 to update the information such as the appropriate temperature range and the final unloading place. Therefore, it is easy to accurately manage the check of the refrigerator inside temperature of the vehicles 2 by reducing the operation error in updating the data.

The server 380 includes the setting unit 382, the determination unit 383, and the notification control unit 385. Therefore, the server 380 can determine whether or not to perform the error notification and control the error notification. Therefore, a function for determining whether or not to perform the error notification can be provided outside the vehicle 2. Therefore, it is possible to determine whether or not to perform the error notification on the server 380, and to appropriately control the error notification. It is possible to determine whether the error notification is necessary at short intervals by performing a series of complicated arithmetic processes related to the error notification at high speed. Therefore, when a temperature abnormality occurs, an error notification can be quickly performed, and the occupant or the manager can quickly deal with the temperature abnormality.

Fourth Embodiment

This embodiment is a modification based on the preceding embodiment. In this embodiment, when the refrigerator inside temperature is out of the appropriate temperature range at the timing when the temperature error notification is not performed, the notification control unit 385 performs the preliminary error notification.

As for the configuration of the air-conditioning system 1, the same configuration as that described in the third embodiment can be adopted. As for the control on the vehicle 2, the same control as the control described in the third embodiment can be adopted.

Figure 16:
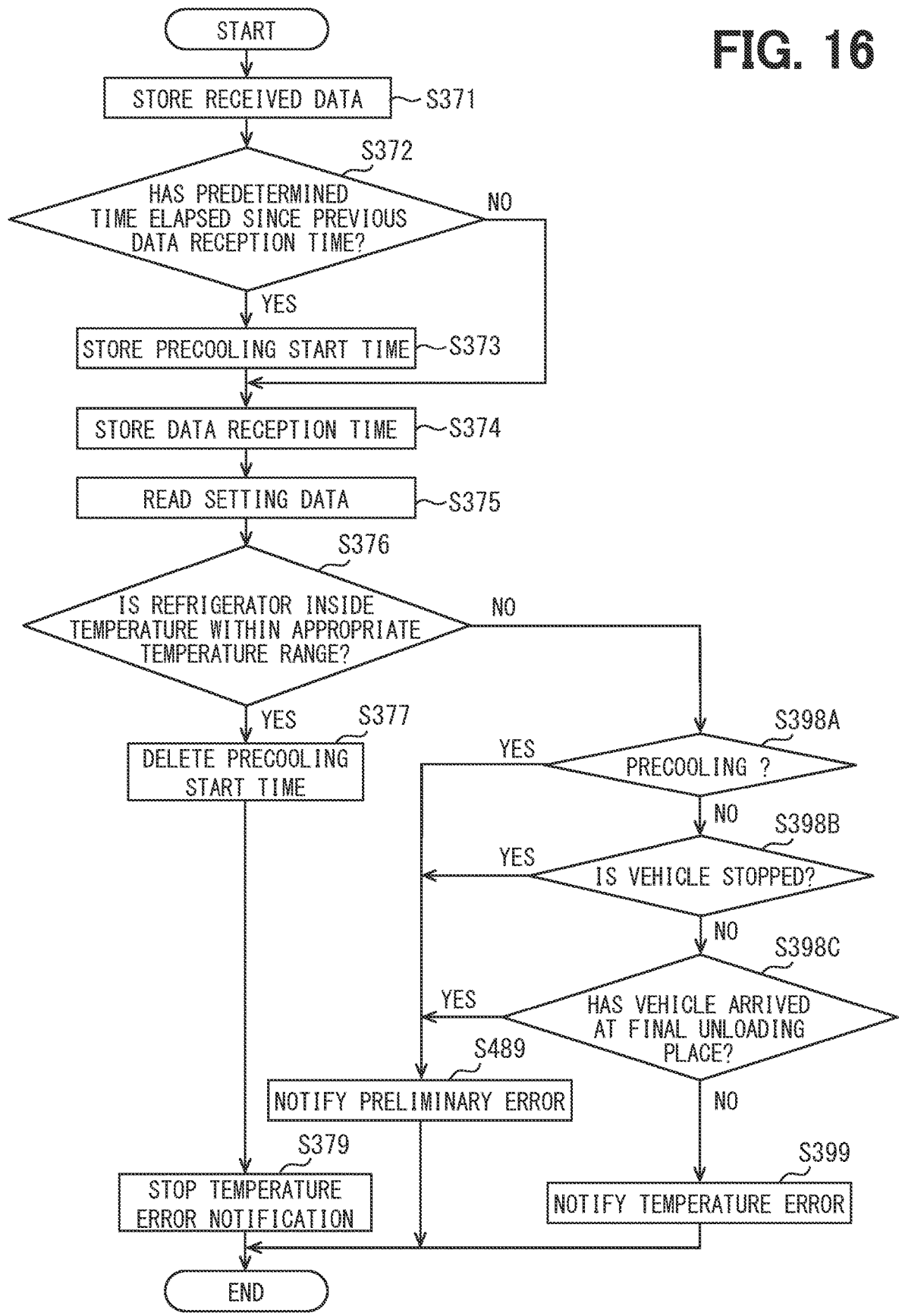
FIG. 16 is a flowchart relating to a control of a server in a fourth embodiment.

The control related to the error notification in the server 380 will be described below, focusing on the parts different from the third embodiment. In FIG. 16, when it is determined in step S398A that the pre-cooling is in progress, the process proceeds to step S489 instead of step S379, and the preliminary error notification is performed. If it is determined in step S398B that the vehicle is stopped, the process proceeds to step S489 instead of step S379, and the preliminary error notification is performed. If it is determined in step S398C that the vehicle has arrived at the final unloading site, the process proceeds to step S489 instead of step S379, and the preliminary error notification is performed.

In step S489, the preliminary error notification is performed. In the preliminary error notification, a warning message indicating that the current temperature inside the refrigerator is not within the appropriate temperature range is displayed on the WEB browser 391 of the administrator terminal 390. Similar to the temperature error notification and the preliminary error notification using the occupant notification device 45, the preliminary error notification is an error notification that is suppressed as compared with the temperature error notification. More specifically, in the preliminary error notification, the size of the warning message displayed on the WEB browser 391 is set smaller than that in the case of the temperature error notification. As a result, the administrator is notified more conservatively that an error related to the temperature of the cold storage 3 has occurred, as compared with the temperature error notification. If the preliminary error notification is an unexpected error notification, the administrator can deal with the temperature abnormality by instructing the occupants to check whether the cold storage door 3d is closed or not. After the preliminary error notification is performed, the state in which the preliminary error notification is performed is maintained and the control on the server 380 is terminated. Step S489 provides an example of a notification step.

The method of suppressing the preliminary error notification as compared with the temperature error notification is not limited to reducing the size of the display. For example, in the preliminary error notification, the loudness of the warning sound emitted from the sounding device of the administrator terminal 390 may be made smaller than in the case of the temperature error notification. Alternatively, in the preliminary error notification, the sound may not be produced from the sounding device of the administrator terminal 390.

According to this embodiment, the notification control unit 385 performs the preliminary error notification when the refrigerator inside temperature is outside the appropriate temperature range at the timing when the temperature error notification is not performed. Therefore, it is possible to properly notify the administrator of the two error notifications, e.g., the temperature error notification and the preliminary error notification. In particular, the administrator can easily recognize what kind of abnormality is occurring by setting the abnormality of high importance as the temperature error notification and the abnormality of low importance as the preliminary error notification. Therefore, the manager can effectively motivate the occupant to deal with the abnormality by giving instructions.

When performing the preliminary error notification, the notification control unit 385 performs suppressed error notification as compared with the temperature error notification. Therefore, in the error notification, the temperature error notification is relatively stronger to the administrator than the preliminary error notification. Therefore, it is easy for the administrator who received the error notification to determine whether the temperature abnormality should be dealt with immediately or not immediately.

Fifth Embodiment

This embodiment is a modification based on the preceding embodiment. In this embodiment, the notification control unit 385 performs a pre-cooling error notification.

As for the overall configuration of the air-conditioning system 1, the same configuration as that described in the third embodiment can be adopted. As for the control performed in the vehicle 2, the same control as the control described in the third embodiment can be adopted.

Figure 17:
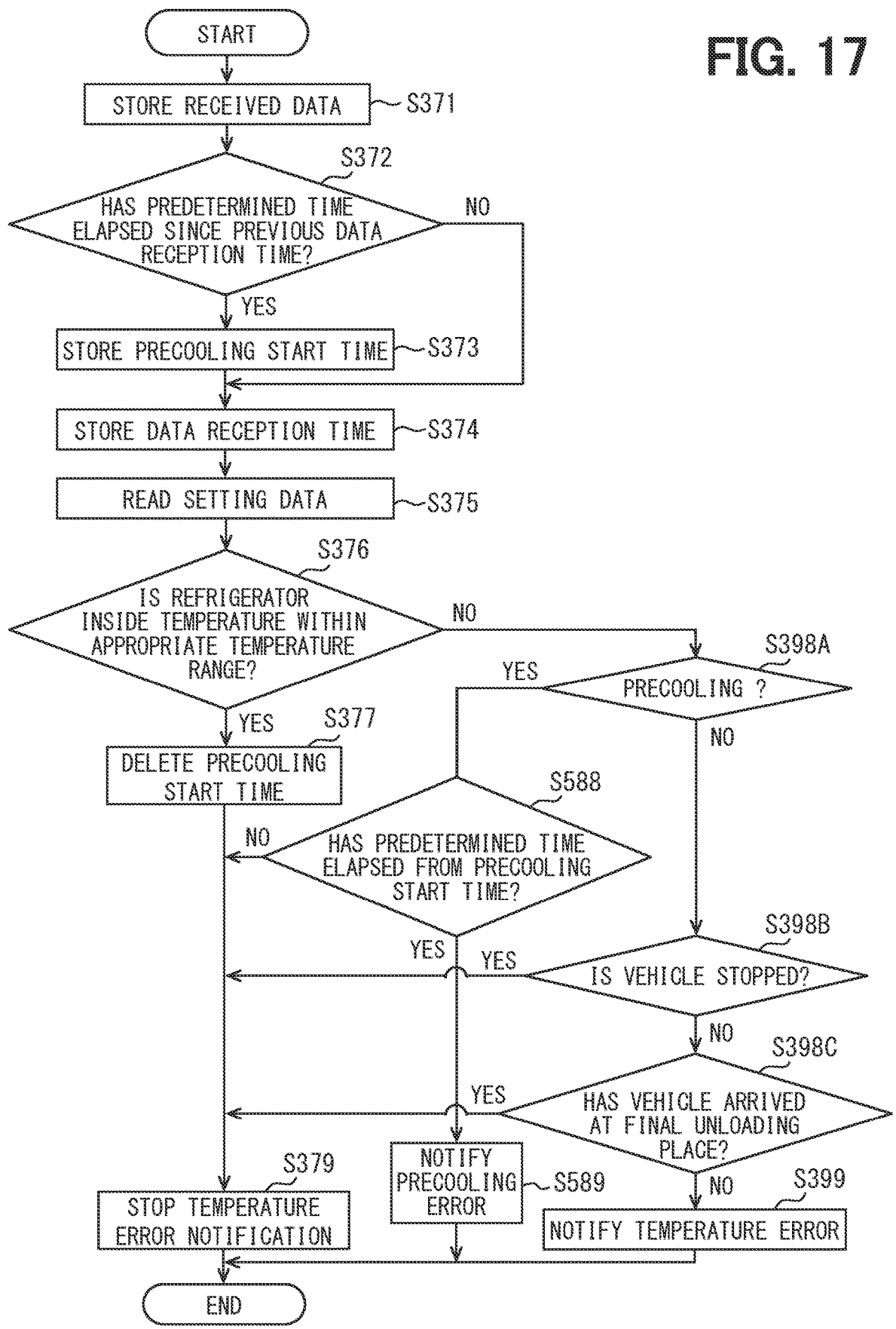
FIG. 17 is a flowchart relating to a control of a server according to a fifth embodiment.

The control related to the error notification by the server 380 will be described below, focusing on the parts different from the third embodiment. In FIG. 17, when it is determined in step S398A that the pre-cooling is in progress, the process proceeds to step S588 instead of step S379.

In step S588, it is determined whether a predetermined time has elapsed from the pre-cooling start time. Here, the predetermined time is, for example, 30 minutes. If a predetermined time has elapsed from the pre-cooling start time, it is determined that the air conditioner 10 may not be functioning properly, and the process proceeds to step S589. If a predetermined time has not elapsed from the pre-cooling start time, it is determined that the air conditioner 10 is functioning properly, and the process proceeds to step S379.

In step S589, the pre-cooling error notification is performed. In the pre-cooling error notification, a warning message indicating that the pre-cooling is not completed within a predetermined time is displayed on the WEB browser 391 of the administrator terminal 390. In addition, a warning sound is emitted from the sounding device of the administrator terminal 390. As a result, the administrator is notified that an error has occurred and the content of the error that has occurred. The administrator can deal with the temperature abnormality by receiving the pre-cooling error notification and instructing the occupant to confirm whether or not the cold storage door 3d is closed. After the pre-cooling error notification is performed, the state in which the pre-cooling error notification is performed is maintained and the control in the server 380 is terminated. Step S589 provides an example of a notification step.

According to this embodiment, the notification control unit 385 performs the pre-cooling error notification when the refrigerator inside temperature does not fall within the appropriate temperature range within a predetermined time after the start of pre-cooling. Therefore, the administrator can recognize the abnormality occurring during the pre-cooling. In particular, when it is set that the temperature error notification is not performed for the administrator during the pre-cooling, the pre-cooling error notification is performed instead of the temperature error notification. Therefore, the abnormality can be notified as the error by the pre-cooling error notification even during the pre-cooling in which the temperature error notification is not performed for the administrator.

Other Embodiments

The error notification may be performed using both the occupant notification device 45 and the administrator terminal 390. According to this, it is possible to notify both the occupant and the manager of the error. Therefore, even if one of them does not notice the error notification, the other can recognize that the error has occurred due to the error notification and deal with it.

The disclosure in the specification, drawings, and the like is not limited to the illustrated embodiments. The disclosure encompasses the illustrated embodiments and variations thereof by those skilled in the art. For example, the present disclosure is not limited to the combinations of components and/or elements shown in the embodiments. The present disclosure may be implemented in various combinations. The present disclosure may have additional members which may be added to the embodiments. The disclosure encompasses omission of components and/or elements of the embodiments. The disclosure encompasses the replacement or combination of components and/or elements between one embodiment and another. The disclosed technical scope is not limited to the description of the embodiments. It should be understood that some disclosed technical ranges are indicated by description of claims, and includes every modification within the equivalent meaning and the scope of description of claims.

The disclosure in the specification, the drawings, and the like is not limited by the description of the claims. The disclosures in the specification, the drawings, and the like encompass the technical ideas described in the claims, and further extend to a wider variety of technical ideas than those in the claims. Hence, various technical ideas can be extracted from the disclosure of the specification, the drawings, and the like without being bound by the description of the claims.

The control unit and method thereof according to the present disclosure may be implemented by one or more special-purposed computers. Such a special-purposed computer may be provided (i) by configuring (a) a processor and a memory programmed to execute one or more functions embodied by a computer program, or (ii) by configuring (b) a processor including one or more dedicated hardware logic circuits, or (iii) by configuring by a combination of (a) a processor and a memory programmed to execute one or more functions embodied by a computer program and (b) a processor including one or more dedicated hardware logic circuits. The technique for realizing the functions of each functional unit included in the device or the method thereof does not necessarily need to include software, and all the functions may be realized using one or more hardware circuits. The computer program may be stored in a computer-readable non-transition tangible storage medium as an instruction executed by a computer.

What is claimed is:

1. An air-conditioning system comprising:
    an air conditioner mounted on a mobile body having a cold storage;
    an internal temperature sensor configured to measure an internal temperature which is a temperature inside the cold storage;
    a notification device configured to notify an error of the air conditioner; and
    a processor and a memory configured to control an air-conditioning operation, acquire the internal temperature,
    set an appropriate temperature range of the cold storage,
    determine whether the internal temperature is within the appropriate temperature range, and
    control an error notification using the notification device, and
    the processor is further configured to perform a temperature error notification when the internal temperature is out of the appropriate temperature range after the air conditioner has completed a pre-cooling that is performed until the internal temperature falls within the appropriate temperature range for the first time after a start of the air-conditioning operation, and does not perform the temperature error notification until the pre-cooling by the air conditioner is completed after the start of the air-conditioning operation.

2. The air-conditioning system according to claim 1, further comprising:
    a position detection device configured to detect a current position of the mobile body, wherein
    the processor is configured to perform a temperature error notification when the internal temperature is out of the appropriate temperature range before the mobile body arrives at an unloading site, and does not perform the temperature error notification after the mobile body arrives at the unloading site.

3. The air-conditioning system according to claim 1, further comprising:
    a vehicle speed sensor configured to detect a moving speed of the mobile body, wherein
    the processor is configured to perform a temperature error notification when the internal temperature is out of the appropriate temperature range while the mobile body is moving, and does not perform the temperature error notification while the mobile body is not moving.

4. The air-conditioning system according to claim 1, further comprising:
    a server that constitutes a part of the processor, wherein
    the air-conditioning system communicates with the server,
    the notification device has an administrator terminal provided outside the mobile body to perform an error notification for an administrator who manages a status of the mobile body from the outside of the mobile body, and
    the processor uses the administrator terminal to perform the temperature error notification.

5. The air-conditioning system according to claim 1, wherein
    the notification device is mounted on the mobile body to perform the error notification for an occupant of the mobile body, and
    the processor uses the notification device to perform the temperature error notification.

6. The air-conditioning system according to claim 1, wherein
    the processor performs a pre-cooling error notification when the internal temperature does not fall within the appropriate temperature range within a predetermined time after starting an air-conditioning operation.

7. The air-conditioning system according to claim 1, wherein
    the processor performs a preliminary error notification when the internal temperature is out of the appropriate temperature range at a timing when the temperature error notification is not performed.

8. The air-conditioning system according to claim 7, wherein
    the processor performs a suppressed error notification which is suppressed compared with a case where the temperature error notification is performed, when the preliminary error notification is performed.

9. The air-conditioning system according to claim 1 further comprising:
    a door open/close sensor configured to detect an opening/closing of a cold storage door which is a door of the cold storage, wherein after detecting that the cold storage door is opened, the processor does not perform the temperature error notification until the internal temperature is within the appropriate temperature range after detecting that the cold storage door is closed.

* * * * *